US012719889B2

(12) United States Patent
Sivajothi et al.

(10) Patent No.: US 12,719,889 B2
(45) **Date of Patent: *Aug. 25, 2026**

(54) ADVANCED CYBERSECURITY SYSTEM FOR REAL-TIME PHISHING DETECTION, ACCOUNT TAKEOVER FRAUD PREVENTION, AND SOFTWARE REPOSITORY OPTIMIZATION USING MACHINE LEARNING TECHNIQUES

(71) Applicant: Bank of America Corporation, Charlotte, NC (US)

(72) Inventors: Sivashalini Sivajothi, Chennai (IN); Maneesh Kumar Sethia, Hyderabad (IN); Boddu Vikas Teja, Chandanagar (IN); Ankit Kumar Sahoo, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 170 days.

This patent is subject to a terminal disclaimer.

(21) Appl. No.: 18/761,641

(22) Filed: Jul. 2, 2024

(65) Prior Publication Data

US 2026/0012465 A1 Jan. 8, 2026

(51) Int. Cl.
*H04L 9/40* (2022.01)

(52) U.S. Cl.
CPC ................................ *H04L 63/1416* (2013.01)

(58) Field of Classification Search
CPC ........................ H04L 63/1416; H04L 63/1483
See application file for complete search history.

(56) References Cited

U.S. PATENT DOCUMENTS

| | | | |
|---|---|---|---|
| 6,904,449 | B1 | 6/2005 | Quinones |
| 7,467,198 | B2 | 12/2008 | Goodman et al. |

(Continued)

FOREIGN PATENT DOCUMENTS

| | | | |
|---|---|---|---|
| CA | 2260481 | A1 | 7/1999 |
| CN | 117296058 | A | 12/2023 |

(Continued)

*Primary Examiner* — Joe Chacko

(74) *Attorney, Agent, or Firm* — Banner & Witcoff, Ltd.

(57) ABSTRACT

Systems and processes are disclosed for enhancing cybersecurity and optimizing software repositories through integration of web crawling, web scraping, feature engineering, and advanced machine learning algorithms to detect phishing attempts, prevent account takeover fraud, and identify unused code in repositories. The system collects and refines data from various sources, including transaction logs, customer databases, device details, external data sources, and historical fraud data, to build comprehensive datasets. Feature engineering creates new, meaningful features from the refined data, which are used to train and evaluate machine learning models. The best-performing models are deployed in production to monitor incoming communications and transactions in real-time, flagging suspicious activities and optimizing codebases. This processing ensures timely detection and prevention of security threats while maintaining efficient software development processes. Robust protection is provided against evolving cyber threats and enhances software performance and security through continuous learning and adaptation.

20 Claims, 9 Drawing Sheets

(56) References Cited

U.S. PATENT DOCUMENTS

| | | | | |
|---|---|---|---|---|
| 8,065,219 | B2 | 11/2011 | Haynie et al. | |
| 9,378,465 | B2 | 6/2016 | Stewart et al. | |
| 9,578,048 | B1 * | 2/2017 | Hunt | H04L 63/1416 |
| 10,108,962 | B1 * | 10/2018 | Sadaghiani | G06N 20/20 |
| 11,341,205 | B1 * | 5/2022 | Mahedy | G06F 3/0481 |
| 11,755,958 | B1 | 9/2023 | Bhattarai et al. | |
| 11,886,403 | B1 | 1/2024 | Serena | |
| 11,888,855 | B2 | 1/2024 | Edwards et al. | |
| 11,922,515 | B1 | 3/2024 | Lombard et al. | |
| 11,924,245 | B2 | 3/2024 | Grewal et al. | |
| 2017/0011029 | A1 | 1/2017 | Chatterjee et al. | |
| 2017/0315764 | A1 * | 11/2017 | Patel | G06F 3/1247 |
| 2020/0143469 | A1 | 5/2020 | Stewart et al. | |
| 2020/0204587 | A1 | 6/2020 | Hunt et al. | |
| 2020/0357059 | A1 | 11/2020 | Kennedy et al. | |
| 2022/0210188 | A1 | 6/2022 | Grewal et al. | |
| 2022/0329626 | A1 | 10/2022 | Sambamoorthy et al. | |
| 2022/0407875 | A1 | 12/2022 | Prudkovskiy et al. | |
| 2023/0056947 | A1 * | 2/2023 | Nitta | G06N 3/096 |
| 2023/0075964 | A1 | 3/2023 | Singh et al. | |
| 2023/0325444 | A1 * | 10/2023 | Moussa | G06F 16/951 707/736 |
| 2023/0344868 | A1 | 10/2023 | Kaligotla | |
| 2023/0403298 | A1 * | 12/2023 | Silva | H04L 63/1483 |
| 2024/0031383 | A1 | 1/2024 | Szurdi et al. | |

FOREIGN PATENT DOCUMENTS

| | | | |
|---|---|---|---|
| EP | 1226495 | A2 | 7/2002 |
| JP | 2008511934 | A | 4/2008 |
| WO | 2017124116 | A1 | 7/2017 |

* cited by examiner

Sample Pseudocode Modules

500: Web Crawling

```
class WebCrawler:
    def __init__(self):
        self.database = Database()
    def crawl(self):
        websites = self.get_all_websites()
        for website in websites:
            data = self.index_website(website)
            self.database.store(data)
    def get_all_websites(self):
        # Retrieve a list of websites to crawl
        return ['http://example.com', 'http://example.org', ...]
    def index_website(self, website):
        content = self.download_content(website)
        metadata = self.extract_metadata(content)
        return {'website': website, 'content': content, 'metadata': metadata}
    def download_content(self, website):
        # Simulate downloading website content
        return f"Content from {website}"
    def extract_metadata(self, content):
        # Simulate extracting metadata from content
        return {'length': len(content), 'num_links': 5, 'has_attachments': True}
class Database:
    def __init__(self):
        self.storage = []
    def store(self, data):
        self.storage.append(data)
```

502: Web Scraping

```
class WebScraper:
    def __init__(self, database):
        self.database = database
        self.structured_data = []
    def scrape(self):
        for data in self.database.storage:
            structured_data = self.extract_features(data)
            self.structured_data.append(structured_data)
    def extract_features(self, data):
        # Extract relevant features from the data
        features = {
            'website': data['website'],
            'content_length': len(data['content']),
            'num_links': data['metadata']['num_links'],
            'has_attachments':
data['metadata']['has_attachments']
        }
        return features
```

504: Random Forest Training

```
from sklearn.ensemble import RandomForestClassifier
class AIModel:
    def __init__(self):
        self.model = RandomForestClassifier()
        self.training_data = []
        self.training_labels = []
    def train(self, data, labels):
        self.training_data = data
        self.training_labels = labels
        self.model.fit(self.training_data, self.training_labels)
    def predict(self, features):
        return self.model.predict([features])[0]
```

506: Feature Engineering

```
class FeatureEngineering:
    def __init__(self):
        pass
    def transform(self, raw_data):
        # Select, manipulate, and transform raw data into useful
features
        transformed_features = {
            'content_length': len(raw_data['content']),
            'num_links': raw_data['num_links'],
            'has_attachments': raw_data['has_attachments']
        }
        return transformed_features
```

508: Integrating the Model

```
class SecuritySystem:
    def __init__(self):
        self.ai_model = AIModel()
        self.feature_engineering = FeatureEngineering()
    def process_incoming_message(self, message):
        features = self.feature_engineering.transform(message)
        prediction = self.ai_model.predict(features)
        if prediction == 1:  # Assuming 1 means phishing
            self.alert_user()
    def alert_user(self):
        print("Phishing Alert!")
```

510: Putting It All Together

```
# Initialize components
database = Database()
web_crawler = WebCrawler()
web_scraper = WebScraper(database)
security_system = SecuritySystem()
# Step 1: Web Crawling
web_crawler.crawl()
# Step 2: Web Scraping
web_scraper.scrape()
# Prepare training data (dummy data for illustration)
training_data = [
    {'content_length': 1200, 'num_links': 2, 'has_attachments': True},
    {'content_length': 800, 'num_links': 0, 'has_attachments': False},
    # Add more training data
]
training_labels = [1, 0]  # Assuming 1 is phishing, 0 is legitimate
# Extract features and labels for training
features = [list(data.values()) for data in training_data]
# Step 3: Random Forest Training
security_system.ai_model.train(features, training_labels)
# Step 4: Process Incoming Messages
incoming_message = {
    'content': 'Example email content...',
    'num_links': 2,
    'has_attachments': True
}
security_system.process_incoming_message(incoming_message)
```

FIG. 5

ADVANCED CYBERSECURITY SYSTEM FOR REAL-TIME PHISHING DETECTION, ACCOUNT TAKEOVER FRAUD PREVENTION, AND SOFTWARE REPOSITORY OPTIMIZATION USING MACHINE LEARNING TECHNIQUES

TECHNICAL FIELD

The invention pertains to the field of cybersecurity and more specifically to systems and methods for the detection and prevention of unauthorized access or manipulation of electronic communications via phishing attempts. The invention focuses on real-time phishing detection, account takeover fraud prevention, and optimization of software repositories using advanced data processing techniques, including web crawling, web scraping, and machine learning algorithms such as Random Forest. This field addresses the critical need for enhanced security measures to protect sensitive personal and financial information from increasingly sophisticated cyber threats. The invention integrates multiple data sources and employs feature engineering to analyze and detect potential threats, thereby providing robust and adaptive security solutions.

DESCRIPTION OF THE RELATED ART

Phishing is a significant and persistent problem in the digital world, posing serious threats to the security of personal and organizational data. It involves deceptive attempts to gather sensitive information such as passwords, credit card details, and other personal information. Attackers cleverly disguise their communications as being from reputable sources, often using emails or SMS messages to lure individuals into providing confidential data. This widespread issue affects countless individuals and organizations globally, leading to financial losses and compromised security.

Real-time phishing attacks have evolved to become more sophisticated, making traditional detection methods less effective. Cybercriminals continually refine their strategies and techniques to bypass existing security measures. This constant evolution of attack methods requires equally dynamic and adaptive detection systems. Current solutions often fail to keep pace with the rapid advancements in phishing tactics, leaving users vulnerable to new and emerging threats.

Many existing anti-phishing technologies rely on outdated methods that do not account for the latest phishing strategies. These traditional systems often use static databases of known phishing sites or simplistic pattern recognition that can easily be evaded by slightly altering the attack vectors. As a result, there is a growing need for more advanced and intelligent systems capable of understanding and reacting to the nuances of modern phishing attacks.

One of the primary challenges in combating phishing is the vast and continuously expanding volume of data that needs to be processed. With millions of emails and messages sent daily, the task of identifying and filtering out phishing attempts is monumental. Current systems often struggle with the sheer scale of data, leading to delays in detection and responses to threats.

Furthermore, the increasing use of social engineering in phishing attacks makes them more personal and harder to detect. Attackers now craft messages that are highly targeted and tailored to individual recipients, making them more convincing and increasing the likelihood of successful deception. This level of personalization in phishing attempts requires a detection system capable of deep content analysis and contextual understanding.

Accuracy is another significant issue with existing anti-phishing systems. False positives, where legitimate communications are mistakenly flagged as phishing attempts, can cause unnecessary disruptions, and erode user trust in the security system. Conversely, false negatives, where actual phishing attempts go undetected, can lead to security breaches. Balancing high accuracy in both detecting phishing attempts and minimizing false identifications is a critical challenge.

The impact of phishing goes beyond individual victims and can have wide-reaching consequences on entire organizations. Phishing attacks can serve as entry points for more extensive security breaches, leading to potential access to broader networks and sensitive information. The ability to detect phishing attempts quickly and accurately is crucial in preventing these larger-scale security incidents.

Despite the efforts to improve phishing detection, many users remain unaware of the best practices for identifying and handling potential phishing attempts. Education and awareness campaigns have been helpful, but the sophistication of attacks often outstrips the general public's understanding of how to protect themselves. This highlights the need for a detection system that not only blocks phishing attempts but also aids in educating users about potential threats.

The reliance on human judgment in identifying phishing attempts is a significant vulnerability. Even well-informed users can sometimes fail to recognize sophisticated phishing messages. This human factor can be the weakest link in the security chain, necessitating a system that reduces the dependency on user discernment and enhances automatic detection capabilities.

The need for an intelligent, adaptable, and highly accurate system to detect phishing emails and SMS (including MMS or the like) messages has been a long-felt and unmet need in the cybersecurity field. The complexity and variability of attacks require a solution that not only addresses current detection gaps but also adapts to evolving threats. A system that can effectively reduce false positives and negatives, handle large volumes of data, and respond to the increasingly sophisticated and personalized nature of phishing attacks would significantly enhance digital security.

SUMMARY OF THE INVENTION

The invention tackles the pressing issue of phishing, a significant threat in the financial world that endangers both individuals and organizations. Phishing attacks involve deceitful attempts to obtain sensitive information such as passwords, credit card details, and personal data by masquerading as trustworthy entities in electronic communications. These attacks often come in the form of emails or messages that lure the recipient into clicking on malicious links or downloading harmful attachments. The continuous evolution of phishing tactics makes it challenging for conventional security systems to keep up, necessitating advanced and adaptive solutions like the one proposed in this invention.

To address this challenge, the invention employs a multifaceted approach starting with web crawling, where a digital search engine bot systematically browses the internet. The web crawler collects and indexes data from various sources, focusing on phishing and legitimate email (or message) patterns. By building a comprehensive database of these patterns, the system creates a robust foundation for identifying phishing attempts. The collected data is meticulously indexed and stored, ensuring that the system has access to a wide range of information for accurate analysis.

Following data collection, the process involves web scraping, where a specialized agent processes the gathered data. The web scraping agent requests and receives data, extracting relevant features from email content, headers, and attachments. This step transforms unstructured data into a structured format, creating detailed representations of email characteristics. These structured representations are essential for training the AI model, which relies on high-quality data to make accurate predictions.

The invention utilizes a Random Forest algorithm as the core of its AI/ML model. This algorithm is trained using a comprehensive training dataset, which allows it to generate an optimal model from multiple random decision trees. The Random Forest method enhances predictive accuracy by averaging the results of various decision trees, each built from different subsets of the data. By learning the relationships between features and their target outcomes, the algorithm can make precise and reliable predictions.

Once the AI model is trained, it is integrated into the system's security infrastructure. This integration involves setting up an API or script that processes incoming emails and SMS messages. The API extracts features from these messages and passes them through the AI model for classification. Feature engineering plays a critical role in this stage, involving the selection, manipulation, and transformation of raw data into useful features. These features are essential for supervised learning, allowing the AI model to accurately classify messages.

The system is designed to operate in real-time, continuously improving its accuracy through feedback from actual phishing attempts and legitimate messages. When an email or SMS message arrives, the feature engineering process extracts relevant features and insights from the content. These transformed features are then modeled to generate accurate predictions, which are used by the AI model to classify the messages. This real-time processing ensures that users receive timely alerts about potential phishing threats.

The Random Forest decision maker is central to the system's functionality. It converts incoming data into subsets and makes final decisions based on the aggregated results of multiple decision trees. This approach ensures that the classification of messages as phishing or legitimate is both reliable and precise. By averaging the results of various decision trees, the system minimizes the risk of false positives and false negatives, providing users with accurate and trustworthy alerts.

The continuous feedback loop is a vital component of the invention. The system uses real-time decisioning feeds to retrain the AI model, allowing it to adapt to new phishing techniques. This feedback loop enhances the model's ability to stay ahead of attackers, maintaining its effectiveness over time. As the system processes more data, it becomes increasingly adept at identifying phishing attempts, providing long-term protection for users.

The invention's technical solution includes several detailed steps. Initially, the web crawler visits a wide range of websites, systematically browsing the internet to identify phishing and legitimate email/message patterns. It builds a comprehensive list, properly indexes it, and stores it in a database for further analysis. This step ensures that the system has a vast and diverse dataset to work with, improving its overall accuracy.

The multi-threaded downloader enhances the efficiency of data collection. It swiftly collects data, adding it to a queue and scheduling indexing as needed. This step ensures that a large volume of data is processed promptly, providing the system with up-to-date information. Once collected, the data is fed into the web scraping agent for further processing. The agent extracts relevant features from email content, headers, and attachments, transforming unstructured data into a structured format.

The structured data is then used as input for the Random Forest algorithm, which begins its training process. The algorithm creates an ensemble of decision trees from the data subsets, improving predictive accuracy through electing and averaging. It learns the intricate relationships between features and their respective targets, enabling it to make accurate predictions. This training process is crucial for the AI model's ability to classify messages correctly.

With a fully trained AI model, the system integrates it into the security infrastructure. This integration involves setting up an API that processes incoming emails and SMS messages. The API extracts relevant features from these messages and passes them through the AI model for classification. Feature engineering refines the data, extracting meaningful content that is crucial for the AI model's decision-making process. This ensures that the system can accurately classify incoming messages as phishing or legitimate.

The system is designed to handle large volumes of data, providing timely and accurate phishing alerts. The use of advanced technologies and continuous feedback loops makes it a powerful tool in the fight against online fraud. The scalable and adaptable solution offers long-term protection for users against evolving phishing threats. By leveraging web crawling and web scraping technologies, the system ensures that it has access to a wide range of data, enhancing its ability to detect phishing patterns.

The Random Forest algorithm's ensemble method improves predictive accuracy, making classifications more reliable. Integration of the trained AI model into the system's security infrastructure ensures efficient processing of incoming emails and SMS/MMS messages (or the like input) (i.e., used herein interchangeably throughout). Feature engineering refines the data, extracting meaningful content crucial for the AI model's decision-making. Continuous improvement through real-time data feedback allows the model to adapt to new phishing methods, maintaining its effectiveness.

The robust design handles large data volumes, providing timely and accurate phishing alerts. Advanced technologies and continuous feedback loops make it a powerful tool in fighting online fraud. The scalable and adaptable solution provides long-term protection against evolving phishing threats. The invention leverages web crawling to build and index data from various sources, enhancing the system's dataset. Web scraping processes this data, extracting relevant features to create structured representations used by the AI model.

The Random Forest algorithm trains on this data, generating accurate predictions through multiple decision trees. Integration into the security infrastructure ensures real-time processing and classification of incoming messages, providing timely phishing alerts and continuous model improvement through feedback loops. The comprehensive approach addresses the dynamic nature of phishing attacks, providing a scalable and adaptable solution.

This invention represents a significant advancement in cybersecurity, offering a reliable and efficient method for detecting and preventing phishing attacks. By leveraging AI and machine learning, the system can adapt to new phishing methods, ensuring that users remain protected from the latest threats. The detailed process of data collection, feature extraction, model training, and real-time decision-making ensures that the system can accurately identify phishing attempts and provide timely alerts. The robust and comprehensive design of the system ensures long-term effectiveness in combating phishing, providing users with a reliable tool to protect their sensitive information.

The invention integrates several core inventive features to enhance its effectiveness in phishing detection and prevention. Web crawling is used to build and index data received from all possible sources, storing it in a database for further analysis. Web scraping processes this data, extracting relevant features to arrive at a structured format suitable for AI model training. The Random Forest algorithm, trained with a comprehensive dataset, generates the best model from multiple decision trees. Feature engineering extracts meaningful content from the data, refining it for better use in the AI model. The trained AI model is integrated into the system's security infrastructure, utilizing real-time decisioning feeds to continuously improve its accuracy. An API script is set up to process the framework, analyzing incoming emails and extracting relevant features for further processing.

When a phishing email or SMS (or like) reaches a user's device, the intelligent framework detects it and alerts the user. The web crawler systematically browses the web to index phishing and legitimate email patterns, storing the output in a database. This data is fed to the web scraping agent, which extracts relevant features to create a structured representation of the email's characteristics for AI model input. The Random Forest algorithm, trained on this dataset, makes precise predictions. Once trained, the model integrates into the security infrastructure, processing incoming messages through an API that extracts features for classification. Feature engineering refines the data, ensuring meaningful content is used in the AI model. Real data is processed in real-time, with the Random Forest decision maker classifying messages as phishing or legitimate, providing timely alerts. Continuous feedback retrains the model, enhancing its ability to adapt to new phishing techniques and ensuring long-term user protection.

The technical solution provided by the invention is comprehensive and detailed. It begins with the web crawler visiting all websites, systematically browsing the internet to identify phishing and legitimate email patterns. The web crawler builds a comprehensive list, properly indexes it, and stores it in a database for further analysis. A focused web crawler ensures that the crawler targets specific content related to phishing, enhancing data collection efficiency and accuracy. Multi-threaded downloading enhances the efficiency of data collection by swiftly collecting data, adding it to a queue, and scheduling indexing as needed. This step ensures that a large volume of data is processed promptly, providing the system with up-to-date information.

Once collected, the data is fed into the web scraping agent for further processing. The agent extracts relevant features from email content, headers, and attachments, transforming unstructured data into a structured format. HTML elements are parsed and identified to create a desired structured representation of email characteristics. This structured data is then used as input for the Random Forest algorithm, which begins its training process. The algorithm creates an ensemble of decision trees from the data subsets, improving predictive accuracy through nominations and averaging. It learns the intricate relationships between features and their respective targets, enabling it to make accurate predictions.

The trained AI model is then integrated into the security infrastructure by setting up an API that processes incoming emails and SMS messages. The API extracts relevant features from these messages and passes them through the AI model for classification. Feature engineering refines the data, extracting meaningful content that is crucial for the AI model's decision-making process. The system is designed to handle real-time data, continuously improving its accuracy through feedback from actual phishing attempts and legitimate messages. When an email or SMS message arrives, the feature engineering process extracts relevant features and insights from the content. These transformed features are then modeled to generate accurate predictions, which are used by the AI model to classify the messages. This real-time processing ensures that users receive timely alerts about potential phishing threats.

The Random Forest decision maker converts the incoming data into subsets and makes final decisions based on the aggregated results of multiple decision trees. This approach ensures that the classification of messages as phishing or legitimate is both reliable and precise. By averaging the results of various decision trees, the system minimizes the risk of false positives and false negatives, providing users with accurate and trustworthy alerts. The continuous feedback loop allows the system to use real-time decisioning feeds to retrain the AI model, enhancing its ability to stay ahead of attackers and maintain its effectiveness over time.

Overall, the invention's comprehensive approach to phishing detection and prevention ensures long-term protection for users against evolving threats. By integrating advanced technologies like web crawling, web scraping, Random Forest algorithms, and feature engineering, the system can accurately identify and classify phishing attempts, providing timely and reliable alerts to users. The continuous feedback loop allows the system to adapt to new phishing methods, ensuring its effectiveness in protecting sensitive information.

Additionally, another aspect of the invention presented addresses multiple critical issues in the realm of cybersecurity and software development, specifically targeting phishing detection, account takeover fraud prevention, and the optimization of software repositories. This innovative system employs a multi-faceted approach that leverages web crawling, web scraping, feature engineering, and advanced machine learning models, such as Random Forest and Support Vector Machine algorithms, to provide comprehensive solutions to these pressing problems.

To combat phishing, the system begins by using web crawlers to systematically browse the internet, collecting data from a wide range of sources including emails, websites, and messaging platforms. This extensive data collection forms the basis for identifying patterns and anomalies associated with phishing attempts. The collected raw data often contains inconsistencies and irrelevant information, which necessitates the use of a web scraper to refine and extract relevant features, ensuring the dataset is clean and accurate for further analysis. The web crawler's ability to gather vast amounts of data from various sources is crucial for building a comprehensive database that can effectively support the subsequent machine learning processes.

Feature engineering plays a pivotal role in enhancing the predictive power of the machine learning models used in this system. By transforming and aggregating the preprocessed data, new and meaningful features are created, which are crucial for accurate phishing detection. The refined dataset is then used to train machine learning models, specifically Random Forest and Support Vector Machine algorithms.

These models are trained on random subsets of the data, using decision trees to make accurate predictions about potential phishing activities. By evaluating these models, the system identifies the best-performing one, which is then deployed to monitor incoming emails and messages in real-time, flagging potentially suspicious communications for further review.

In addressing account takeover fraud, the invention extends its data collection capabilities to gather information from transaction logs, customer information databases, device details, external data sources, and historical fraud data. This comprehensive dataset enables the system to analyze behavior patterns and detect anomalies indicative of account takeover attempts. Similar to the phishing detection process, a web scraper refines this data, extracting relevant information and ensuring its accuracy. The ability to process diverse data sources allows the system to build a robust model that can effectively distinguish between legitimate and fraudulent activities.

Feature engineering is again employed to create meaningful features from the refined dataset, enhancing the machine learning models' ability to detect fraudulent activities. The system trains Random Forest and Support Vector Machine models on this dataset, evaluating them to identify the most effective model for account takeover fraud detection. The best-performing model is then deployed into production, where it continuously monitors transactions and account activities, flagging suspicious behavior in real-time to prevent unauthorized access and fraudulent transactions. This real-time monitoring capability is critical for swiftly identifying and mitigating potential fraud before significant damage occurs.

The invention also tackles the problem of unused code accumulation in software repositories. Over time, as technology has advanced, large amounts of redundant or obsolete code have accumulated, leading to increased build sizes and potential security vulnerabilities. The system uses web crawling to collect data from code repositories, identifying and indexing all code segments. A web scraper then processes this data, extracting relevant features and transforming it into a structured format. This step ensures that the system has a detailed understanding of the codebase, which is essential for accurately identifying unused code.

Feature engineering is applied to the refined dataset to create new features that can distinguish between useful and redundant code. The system trains machine learning models, specifically Random Forest and Support Vector Machine algorithms, to identify unused code based on these features. By evaluating the models, the system selects the best-performing one, which is then used to continuously analyze code repositories. This analysis identifies and flags unused code segments, allowing developers to remove them, thereby optimizing build sizes and improving software performance and security. This process not only reduces the size of the build files but also helps in maintaining a cleaner and more efficient codebase.

The integration of these advanced techniques ensures that the system provides robust solutions to phishing detection, account takeover fraud prevention, and software repository optimization. By leveraging comprehensive data collection, feature engineering, and machine learning, the invention offers real-time monitoring and detection capabilities, significantly enhancing cybersecurity and software development processes. The system's ability to operate continuously and adapt to new threats and changes in technology makes it a valuable tool in the ongoing battle against cybercrime and inefficiencies in software development.

The system is designed to operate continuously, adapting to new threats and evolving technologies. The continuous feedback loop incorporated in the system allows it to learn from real-time data, improving its accuracy and effectiveness over time. This adaptability is crucial for maintaining robust security measures in the face of ever-changing cyber threats and technological advancements. The system's continuous learning capability ensures that it remains effective in detecting new and emerging threats, providing long-term protection for users.

The invention's ability to analyze large volumes of data in real-time ensures timely detection and prevention of security threats, providing users with immediate alerts and actionable insights. This real-time processing capability is essential for mitigating the risks associated with phishing and account takeover fraud, as well as for maintaining the efficiency of software development by optimizing code repositories. The prompt alerts enable users to take swift action, reducing the potential impact of security breaches and inefficiencies.

Moreover, the system's use of advanced machine learning models like Random Forest and Support Vector Machine algorithms provides high accuracy in detecting security threats and optimizing code. These models are capable of handling complex data structures and identifying subtle patterns that may be indicative of fraudulent activities or redundant code. The robustness of these models ensures that the system can accurately detect threats and optimize code repositories, enhancing overall security and efficiency.

The deployment of the best-performing models into production environments ensures that the system remains effective and reliable. By continuously monitoring incoming data and transactions, the system can provide real-time alerts, enabling swift action to prevent security breaches and optimize software builds. The real-time deployment of these models is crucial for maintaining high levels of security and efficiency in dynamic environments.

The invention's comprehensive approach to cybersecurity and software optimization addresses long-standing challenges in these fields. By integrating data collection, refinement, feature engineering, and machine learning, the system provides a holistic solution that enhances both security and efficiency. The system's ability to address multiple problems simultaneously makes it a versatile and powerful tool for improving cybersecurity and software development processes.

In conclusion, the invention fulfills a long-felt and unmet need in the cybersecurity and software development domains. The advanced techniques employed by the system offer robust protection against phishing and account takeover fraud while also optimizing software repositories by identifying and eliminating unused code. This multifaceted approach ensures that users are safeguarded against emerging threats and that software development processes are streamlined, resulting in improved performance and security. The system's comprehensive and adaptive nature makes it an indispensable tool in the ongoing effort to enhance cybersecurity and optimize software development.

In light of the foregoing, the following provides a simplified summary of the present disclosure to offer a basic understanding of its various parts. This summary is not exhaustive, nor does it limit the exemplary aspects of the inventions described herein. It is not designed to identify key or critical elements or steps of the disclosure, nor to define its scope. Rather, it is intended, as understood by a person of ordinary skill in the art, to introduce some concepts of the disclosure in a simplified form as a precursor to the more detailed description that follows. The specification throughout this application contains sufficient written descriptions of the inventions, including exemplary, non-exhaustive, and non-limiting methods and processes for making and using the inventions. These descriptions are presented in full, clear, concise, and exact terms to enable skilled artisans to make and use the inventions without undue experimentation, and they delineate the best mode contemplated for carrying out the inventions.

In one aspect, in some arrangements, an information-security, cybersecurity, or the like (used interchangeably herein) method for detecting phishing emails and text messages comprises the steps of accessing the internet to gather data from various online sources, including websites, email servers, and messaging platforms. The method involves executing multi-threaded downloaders to handle multiple data streams simultaneously, where the multi-threaded downloaders include queue and scheduler processes for managing and prioritizing downloading tasks, ensuring efficient and timely data collection without bottlenecks or delays. The downloaded data is stored in a repository, which comprises a database designed to handle large volumes of unstructured data, including raw HTML content, email headers, bodies, and attachments. A web scraping agent is executed to analyze and extract relevant features from the stored data, where the web scraping agent parses and identifies HTML elements, metadata, and other indicators to transform unstructured data into a structured data model that is suitable for machine learning analysis. Both the original unstructured data and the newly created structured data are stored in the database, ensuring that the system retains comprehensive records for further analysis and reference. An after-processing dataset is generated that includes both a testing dataset and a training dataset for machine learning analysis, ensuring that the data is properly partitioned to facilitate effective model training and validation. Multiple Random Forest models are evaluated using the testing dataset to determine their accuracy in predicting phishing attempts, involving rigorous testing, cross-validation, and performance metrics analysis to identify the best-performing models. One or more optimal Random Forest models are selected based on the evaluation results, ensuring that the chosen models provide the highest predictive accuracy and reliability for phishing detection. The selected Random Forest models are applied to generate phishing predictions from new data, using the trained models to classify incoming emails and messages as phishing or legitimate. Feature extraction is performed to identify specific attributes from the data that are most relevant for detecting phishing, including but not limited to sender's email address, subject line, embedded hyperlinks, message body content, and attachments. An evaluation model is executed to assess the accuracy of the feature extraction process and the overall predictive performance of the system, ensuring that the extracted features contribute meaningfully to the detection process. A machine learning algorithm is executed to learn from the data and improve future predictions, where the machine learning algorithm continuously adapts to new phishing techniques through ongoing training and updating of the model. A trained model representing the best-performing version of the machine learning algorithm is generated, ensuring that the model is optimized for high accuracy and reliability in phishing detection. The trained model is integrated into the system's security infrastructure by setting up an API or script to process incoming emails and SMS messages, where the API extracts features from these messages and passes them through the trained model for classification, enabling real-time analysis and detection. Feature engineering is used to refine the data, involving the selection, manipulation, and transformation of raw data into useful features for supervised learning, ensuring that the data fed into the model is of the highest quality. Real-time processing is provided to generate accurate predictions and timely alerts about potential phishing threats, ensuring that users receive immediate notifications about suspicious activities. Final decisions are made based on the aggregated results of multiple decision trees from the Random Forest algorithm, ensuring reliable and precise classification of messages as phishing or legitimate by averaging the results from the decision trees. A continuous feedback loop is utilized to retrain the AI model using real-time decisioning feeds, enhancing the model's ability to adapt to new phishing techniques and maintain its effectiveness over time, ensuring long-term protection against evolving threats.

In some arrangements, the information-security method includes the step of executing multi-threaded downloaders, which includes managing the prioritization and organization of downloading tasks using advanced scheduling algorithms to optimize the efficiency of data collection processes.

In some arrangements, the information-security method involves storing the downloaded data by creating a repository that not only includes email messages, website content, and other relevant information indicative of phishing activities but also ensures data redundancy and backup for enhanced data security.

In some arrangements, the information-security method involves the web scraping agent processing the data by breaking it down into smaller components such as email headers, bodies, attachments, and embedded hyperlinks, and then transforming these components into a structured data format suitable for further analysis.

In some arrangements, the information-security method involves organizing the structured data model into a hierarchical format with labeled features, making it easier to identify patterns and anomalies indicative of phishing, and including metadata for each data point to provide context for machine learning analysis.

In some arrangements, the information-security method includes evaluating the Random Forest models based on their performance under different conditions and with different types of data, using techniques such as cross-validation, receiver operating characteristic (ROC) curves, and confusion matrices to ensure robustness and accuracy.

In some arrangements, the information-security method includes feature extraction that involves isolating specific attributes from the data, such as sender's email address, subject line, embedded hyperlinks, message body content, attachments, and additional metadata such as email send time and domain reputation, to enhance the detection of phishing attempts.

In some arrangements, the information-security method involves the machine learning algorithm learning the relationships between the extracted features and their target outcomes through iterative training processes, utilizing techniques such as gradient boosting, bagging, and ensemble learning to improve its predictive capabilities.

In some arrangements, the information-security method includes the API or script set up for processing incoming emails and SMS messages, which provides immediate phishing detection and alerts by analyzing the messages in real-time, leveraging the trained model to classify messages and generate alerts for users, including detailed explanations of why a message was flagged as phishing.

In some arrangements, the information-security method includes the continuous feedback loop that allows the system to incorporate new data from actual phishing attempts and legitimate messages, continuously improving the model's accuracy and effectiveness over time through techniques such as active learning, reinforcement learning, and periodic retraining sessions to adapt to evolving phishing techniques and threats.

In some arrangements, an information-security system for detecting phishing emails and SMS messages comprises a data collection module configured to access the internet to gather data from various online sources, including websites, email servers, and messaging platforms, where the data collection module operates continuously to ensure up-to-date information is collected for analysis. The system includes multi-threaded downloaders within the data collection module, designed to handle multiple data streams simultaneously, incorporating advanced queue and scheduler processes for managing and prioritizing downloading tasks, ensuring efficient and timely data collection without bottlenecks or delays by dynamically adjusting to network conditions and data source availability.

A repository is provided for storing the downloaded data, where the repository is a high-capacity database designed to handle large volumes of unstructured data, including raw HTML content, email headers, bodies, attachments, and metadata, with capabilities for indexing and cataloging the data for quick retrieval and analysis. The system features a web scraping agent configured to analyze and extract relevant features from the stored data, where the web scraping agent parses and identifies HTML elements, metadata, and other indicators using natural language processing and pattern recognition techniques to transform unstructured data into a structured data model suitable for machine learning analysis. Both the original unstructured data and the newly created structured data are stored in the database, ensuring the system retains comprehensive records for further analysis and reference, with secure storage mechanisms to protect sensitive information.

The system includes a dataset generation module configured to create an after-processing dataset that includes both a testing dataset and a training dataset for machine learning analysis, ensuring the data is properly partitioned to facilitate effective model training and validation, using stratified sampling techniques to maintain data representativeness. An evaluation module is provided to assess multiple Random Forest models using the testing dataset to determine their accuracy in predicting phishing attempts, involving rigorous testing, cross-validation, and performance metrics analysis, including precision, recall, F1 score, and area under the ROC curve, to identify the best-performing models. A selection module is configured to choose one or more optimal Random Forest models based on the evaluation results, ensuring the chosen models provide the highest predictive accuracy and reliability for phishing detection by considering model stability and generalizability.

The system includes a prediction module configured to apply the selected Random Forest models to generate phishing predictions from new data, using the trained models to classify incoming emails and messages as phishing or legitimate, providing detailed probability scores and classification explanations for each prediction.

A feature extraction module is provided to identify specific attributes from the data that are most relevant for detecting phishing, including but not limited to sender's email address, subject line, embedded hyperlinks, message body content, attachments, email send time, domain reputation, and language patterns. An evaluation model execution module is configured to assess the accuracy of the feature extraction process and the overall predictive performance of the system, using statistical analysis and validation techniques to ensure the extracted features contribute meaningfully to the detection process. The system includes a machine learning module configured to execute a machine learning algorithm to learn from the data and improve future predictions, where the machine learning algorithm continuously adapts to new phishing techniques through ongoing training and updating of the model, utilizing techniques such as incremental learning and transfer learning to maintain model relevance.

A model generation module is configured to create a trained model representing the best-performing version of the machine learning algorithm, ensuring the model is optimized for high accuracy and reliability in phishing detection by performing hyperparameter tuning and model optimization. An integration module is configured to incorporate the trained model into the system's security infrastructure by setting up an API or script to process incoming emails and SMS messages, where the API extracts features from these messages and passes them through the trained model for classification, enabling real-time analysis and detection, with automated alert mechanisms for phishing attempts.

The system includes a feature engineering module configured to refine the data, involving the selection, manipulation, and transformation of raw data into useful features for supervised learning, ensuring the data fed into the model is of the highest quality by applying techniques such as normalization, scaling, and dimensionality reduction. A real-time processing module is provided to generate accurate predictions and timely alerts about potential phishing threats, ensuring users receive immediate notifications about suspicious activities, with customizable alert settings and integration with existing security systems. The system includes a decision-making module configured to make final decisions based on the aggregated results of multiple decision trees from the Random Forest algorithm, ensuring reliable and precise classification of messages as phishing or legitimate by averaging the results from the decision trees and providing confidence scores for each classification. A feedback module is configured to utilize a continuous feedback loop to retrain the AI model using real-time decisioning feeds, enhancing the model's ability to adapt to new phishing techniques and maintain its effectiveness over time, ensuring long-term protection against evolving threats by incorporating feedback from user interactions and system performance metrics.

In some arrangements, the multi-threaded downloaders further include advanced scheduling algorithms to optimize the efficiency of data collection processes by managing the prioritization and organization of downloading tasks, dynamically adjusting to network traffic, data source availability, and download completion status. In some arrangements, the repository is configured to not only include email messages, website content, and other relevant information indicative of phishing activities but also to ensure data redundancy and backup for enhanced data security, using distributed storage systems and encryption techniques to protect the integrity and confidentiality of the stored data.

In some arrangements, the web scraping agent is further configured to break down data into smaller components such as email headers, bodies, attachments, and embedded hyperlinks, and then transform these components into a structured data format suitable for further analysis, employing advanced parsing algorithms and regular expressions to accurately extract and structure the data.

In some arrangements, the structured data model organizes the data into a hierarchical format with labeled features, making it easier to identify patterns and anomalies indicative of phishing, and includes metadata for each data point to provide context for machine learning analysis, supporting efficient querying and retrieval for model training and evaluation.

In some arrangements, the evaluation module is further configured to use techniques such as cross-validation, receiver operating characteristic (ROC) curves, and confusion matrices to ensure the robustness and accuracy of the Random Forest models under different conditions and with different types of data, providing comprehensive performance reports and visualizations for model comparison.

In some arrangements, the feature extraction module includes capabilities for isolating specific attributes from the data, such as sender's email address, subject line, embedded hyperlinks, message body content, attachments, email send time, domain reputation, and language patterns, using feature selection algorithms like chi-square, mutual information, and recursive feature elimination to enhance the detection of phishing attempts.

In some arrangements, the machine learning module is further configured to use techniques such as gradient boosting, bagging, and ensemble learning to improve its predictive capabilities through iterative training processes, incorporating techniques like grid search and random search for hyperparameter optimization.

In some arrangements, the integration module includes an API or script that provides immediate phishing detection and alerts by analyzing the messages in real-time, leveraging the trained model to classify messages and generate alerts for users, including detailed explanations of why a message was flagged as phishing, with options for user feedback and interaction to continuously refine the model.

In some arrangements, an information-security method for detecting phishing emails and text messages comprises the steps of accessing the internet to gather data from various online sources. The method involves executing multi-threaded downloaders to handle multiple data streams simultaneously, where the multi-threaded downloaders include queue and scheduler processes for managing downloading tasks. The downloaded data is stored in a repository. A web scraping agent is executed to analyze and extract relevant features from the stored data, where the web scraping agent parses and identifies HTML elements to transform unstructured data into a structured data model. Both the original data and the structured data are stored in a database. An after-processing dataset is generated that includes a testing dataset and a training dataset for machine learning analysis. Multiple Random Forest models are evaluated using the testing dataset to determine their accuracy in predicting phishing attempts. One or more optimal Random Forest models are selected based on the evaluation results. The selected Random Forest models are applied to generate phishing predictions from new data. Feature extraction is performed to identify specific attributes from the data that are most relevant for detecting phishing. An evaluation model is executed to assess the accuracy of the feature extraction and the overall predictive performance of the system. A machine learning algorithm is executed to learn from the data and improve future predictions, where the machine learning algorithm continuously adapts to new phishing techniques. A trained model representing the best-performing version of the machine learning algorithm is generated. The trained model is integrated into the system's security infrastructure by setting up an API or script to process incoming emails and SMS messages, where the API extracts features from these messages and passes them through the trained model for classification. Feature engineering is used to refine the data, involving the selection, manipulation, and transformation of raw data into useful features for supervised learning. Real-time processing is provided to generate accurate predictions and timely alerts about potential phishing threats. Final decisions are made based on the aggregated results of multiple decision trees from the Random Forest algorithm, ensuring reliable and precise classification of messages as phishing or legitimate. A continuous feedback loop is utilized to retrain the AI model using real-time decisioning feeds, enhancing the model's ability to adapt to new phishing techniques and maintain its effectiveness over time.

In another aspect, in some arrangements, a cybersecurity method for detecting phishing, preventing account takeover fraud, and optimizing software repositories comprises the steps of accessing the internet to gather data from various online sources including websites, email servers, messaging platforms, transaction logs, customer information databases, device details, external data sources, and historical fraud data, wherein the data collection is performed continuously to ensure up-to-date information is available for analysis. The method includes executing multi-threaded downloaders to handle multiple data streams simultaneously, where the multi-threaded downloaders include queue and scheduler processes for managing and prioritizing downloading tasks, dynamically adjusting to network conditions and data source availability to ensure efficient and timely data collection without bottlenecks or delays. It involves storing the downloaded data in a repository comprising a high-capacity database designed to handle large volumes of unstructured data, including raw HTML content, email headers, bodies, attachments, transaction logs, and other relevant information, with capabilities for indexing and cataloging the data for quick retrieval and analysis, and ensuring data redundancy and backup for enhanced data security.

The method also entails executing a web scraping agent to analyze and extract relevant features from the stored data, where the web scraping agent parses and identifies HTML elements, metadata, and other indicators using natural language processing and pattern recognition techniques to transform unstructured data into a structured data model suitable for machine learning analysis, including breaking down data into smaller components such as email headers, bodies, attachments, and embedded hyperlinks. Additionally, the method includes generating an after-processing dataset that includes a testing dataset and a training dataset for machine learning analysis, ensuring that the data is properly partitioned to facilitate effective model training and validation, using stratified sampling techniques to maintain data representativeness.

The method involves evaluating multiple machine learning models, including Random Forest and Support Vector Machine (SVM) algorithms, using the testing dataset to determine their accuracy in predicting phishing attempts and account takeover fraud, involving rigorous testing, cross-validation, and performance metrics analysis, including precision, recall, F1 score, and area under the receiver operating characteristic (ROC) curve, to identify the best-performing models. It includes selecting one or more optimal machine learning models based on the evaluation results, ensuring that the chosen models provide the highest predictive accuracy and reliability for phishing detection and account takeover fraud prevention by considering model stability and generalizability. The method involves applying the selected machine learning models to generate phishing predictions from new data, using the trained models to classify incoming emails and messages as phishing or legitimate, providing detailed probability scores and classification explanations for each prediction.

The method includes performing feature extraction to identify specific attributes from the data that are most relevant for detecting phishing and account takeover fraud, including sender's email address, subject line, embedded hyperlinks, message body content, attachments, transaction anomalies, login locations, device fingerprints, email send time, and domain reputation, using feature selection algorithms such as chi-square, mutual information, and recursive feature elimination to enhance the detection capabilities.

Furthermore, the method involves executing a machine learning algorithm to learn from the data and improve future predictions, where the machine learning algorithm continuously adapts to new phishing techniques and account takeover methods through ongoing training and updating of the model, utilizing techniques such as gradient boosting, bagging, and ensemble learning to improve its predictive capabilities through iterative training processes. The method includes generating a trained model representing the best-performing version of the machine learning algorithm, ensuring that the model is optimized for high accuracy and reliability in phishing detection and account takeover fraud prevention by performing hyperparameter tuning and model optimization. Finally, the method involves integrating the trained model into the system's security infrastructure by setting up an API or script to process incoming emails, SMS messages, and transactions, where the API extracts features from these messages and transactions and passes them through the trained model for classification, enabling real-time analysis and detection with automated alert mechanisms for phishing attempts and fraudulent transactions.

The method uses feature engineering to refine the data, involving the selection, manipulation, and transformation of raw data into useful features for supervised learning, ensuring that the data fed into the model is of the highest quality by applying techniques such as normalization, scaling, and dimensionality reduction. It includes providing real-time processing to generate accurate predictions and timely alerts about potential phishing attempts, account takeover fraud, and unused code segments in software repositories, ensuring users receive immediate notifications about suspicious activities, with customizable alert settings and integration with existing security systems. The method continuously monitors incoming data and transactions, flagging suspicious behavior in real-time to prevent unauthorized access and fraudulent transactions, where the monitoring includes analyzing behavior patterns and detecting anomalies indicative of account takeover attempts. It involves identifying and flagging unused code segments in software repositories, allowing developers to remove them, thereby optimizing build sizes and improving software performance and security, where the identification involves analyzing code usage frequency, dependency analysis, and code complexity metrics to accurately identify segments of code that are no longer needed.

Finally, the method utilizes a continuous feedback loop to retrain the AI model using real-time decisioning feeds, enhancing the model's ability to adapt to new phishing techniques, account takeover methods, and changes in the codebase, ensuring long-term protection against evolving threats and maintaining high levels of accuracy in detecting phishing attempts, preventing account takeover fraud, and optimizing software repositories through techniques such as active learning, reinforcement learning, and periodic retraining sessions.

In some arrangements, the method further comprises the step of implementing advanced scheduling algorithms within the multi-threaded downloaders, wherein the advanced scheduling algorithms optimize the efficiency of data collection processes by dynamically managing the prioritization and organization of downloading tasks based on network traffic, data source availability, and download completion status.

In some arrangements, the method further comprises the step of ensuring data redundancy and backup within the repository by utilizing distributed storage systems and encryption techniques, thereby protecting the integrity and confidentiality of the stored data against potential loss or unauthorized access.

In some arrangements, the web scraping agent further breaks down data into smaller components such as email headers, bodies, attachments, and embedded hyperlinks, and transforms these components into a structured data format suitable for further analysis, employing advanced parsing algorithms and regular expressions to accurately extract and structure the data.

In some arrangements, the structured data model organizes the data into a hierarchical format with labeled features, making it easier to identify patterns and anomalies indicative of phishing and account takeover fraud, and includes metadata for each data point to provide context for machine learning analysis, supporting efficient querying and retrieval for model training and evaluation.

In some arrangements, the method further comprises the step of evaluating the machine learning models using techniques such as cross-validation, receiver operating characteristic (ROC) curves, and confusion matrices to ensure the robustness and accuracy of the models under different conditions and with different types of data, providing comprehensive performance reports and visualizations for model comparison.

In some arrangements, the feature extraction step includes isolating specific attributes from the data, such as sender's email address, subject line, embedded hyperlinks, message body content, attachments, email send time, domain reputation, and language patterns, using feature selection algorithms like chi-square, mutual information, and recursive feature elimination to enhance the detection of phishing attempts and account takeover fraud.

In some arrangements, the machine learning algorithm further employs techniques such as gradient boosting, bagging, and ensemble learning to improve its predictive capabilities through iterative training processes, incorporating methods like grid search and random search for hyperparameter optimization.

In some arrangements, the integration of the trained model into the system's security infrastructure includes setting up an API or script that provides immediate phishing detection and alerts by analyzing the messages and transactions in real-time, leveraging the trained model to classify messages and transactions, generate alerts for users, and include detailed explanations of why a message or transaction was flagged as phishing or fraudulent, with options for user feedback and interaction to continuously refine the model.

In some arrangements, the continuous feedback loop further incorporates active learning, reinforcement learning, and periodic retraining sessions to adapt to evolving phishing techniques and threats, utilizing new data from actual phishing attempts and legitimate messages to continuously improve the model's accuracy and effectiveness over time, ensuring long-term protection against emerging cyber threats.

In some arrangements, an advanced cybersecurity system for detecting phishing, preventing account takeover fraud, and optimizing software repositories comprises a data collection module configured to access the internet to gather data from various online sources including websites, email servers, messaging platforms, transaction logs, customer information databases, device details, external data sources, and historical fraud data. This module operates continuously to ensure up-to-date information is collected for analysis. The system includes multi-threaded downloaders within the data collection module designed to handle multiple data streams simultaneously, incorporating advanced queue and scheduler processes for managing and prioritizing downloading tasks, dynamically adjusting to network conditions and data source availability to ensure efficient and timely data collection without bottlenecks or delays. The system further comprises a repository for storing the downloaded data, where the repository is a high-capacity database designed to handle large volumes of unstructured data, including raw HTML content, email headers, bodies, attachments, transaction logs, and other relevant information, with capabilities for indexing and cataloging the data for quick retrieval and analysis, and ensuring data redundancy and backup for enhanced data security.

In some arrangements, the system includes a web scraping agent configured to analyze and extract relevant features from the stored data, where the web scraping agent parses and identifies HTML elements, metadata, and other indicators using natural language processing and pattern recognition techniques to transform unstructured data into a structured data model suitable for machine learning analysis. This includes breaking down data into smaller components such as email headers, bodies, attachments, and embedded hyperlinks. The system also comprises a dataset generation module configured to create an after-processing dataset that includes both a testing dataset and a training dataset for machine learning analysis, ensuring the data is properly partitioned to facilitate effective model training and validation, using stratified sampling techniques to maintain data representativeness.

In some arrangements, the system includes an evaluation module configured to assess multiple machine learning models, including Random Forest and Support Vector Machine (SVM) algorithms, using the testing dataset to determine their accuracy in predicting phishing attempts and account takeover fraud. This involves rigorous testing, cross-validation, and performance metrics analysis, including precision, recall, F1 score, and area under the receiver operating characteristic (ROC) curve, to identify the best-performing models. The system further includes a selection module configured to choose one or more optimal machine learning models based on the evaluation results, ensuring the chosen models provide the highest predictive accuracy and reliability for phishing detection and account takeover fraud prevention by considering model stability and generalizability.

In some arrangements, the system includes a prediction module configured to apply the selected machine learning models to generate phishing predictions from new data, using the trained models to classify incoming emails and messages as phishing or legitimate, providing detailed probability scores and classification explanations for each prediction. The system also comprises a feature extraction module configured to identify specific attributes from the data that are most relevant for detecting phishing and account takeover fraud, including sender's email address, subject line, embedded hyperlinks, message body content, attachments, transaction anomalies, login locations, device fingerprints, email send time, and domain reputation. This module uses feature selection algorithms such as chi-square, mutual information, and recursive feature elimination to enhance the detection capabilities.

In some arrangements, the system includes a machine learning module configured to execute a machine learning algorithm to learn from the data and improve future predictions, where the machine learning algorithm continuously adapts to new phishing techniques and account takeover methods through ongoing training and updating of the model. This utilizes techniques such as gradient boosting, bagging, and ensemble learning to improve its predictive capabilities through iterative training processes. The system also includes a model generation module configured to create a trained model representing the best-performing version of the machine learning algorithm, ensuring the model is optimized for high accuracy and reliability in phishing detection and account takeover fraud prevention by performing hyperparameter tuning and model optimization.

In some arrangements, the system includes an integration module configured to incorporate the trained model into the system's security infrastructure by setting up an API or script to process incoming emails, SMS messages, and transactions. The API extracts features from these messages and transactions and passes them through the trained model for classification, enabling real-time analysis and detection with automated alert mechanisms for phishing attempts and fraudulent transactions. The system also comprises a feature engineering module configured to refine the data, involving the selection, manipulation, and transformation of raw data into useful features for supervised learning. This ensures the data fed into the model is of the highest quality by applying techniques such as normalization, scaling, and dimensionality reduction.

In some arrangements, the system includes a real-time processing module configured to generate accurate predictions and timely alerts about potential phishing attempts, account takeover fraud, and unused code segments in software repositories. This module ensures users receive immediate notifications about suspicious activities, with customizable alert settings and integration with existing security systems. The system further includes a continuous monitoring module configured to monitor incoming data and transactions, flagging suspicious behavior in real-time to prevent unauthorized access and fraudulent transactions. This monitoring includes analyzing behavior patterns and detecting anomalies indicative of account takeover attempts.

In some arrangements, the system includes an optimization module configured to identify and flag unused code segments in software repositories, allowing developers to remove them, thereby optimizing build sizes and improving software performance and security. This identification involves analyzing code usage frequency, dependency analysis, and code complexity metrics to accurately identify segments of code that are no longer needed. The system also comprises a feedback module configured to utilize a continuous feedback loop to retrain the AI model using real-time decisioning feeds. This module enhances the model's ability to adapt to new phishing techniques, account takeover methods, and changes in the codebase, ensuring long-term protection against evolving threats and maintaining high levels of accuracy in detecting phishing attempts, preventing account takeover fraud, and optimizing software repositories through techniques such as active learning, reinforcement learning, and periodic retraining sessions.

In some arrangements, a cybersecurity method for detecting phishing, preventing account takeover fraud, and optimizing software repositories comprises the steps of accessing the internet to gather data from various online sources including websites, email servers, messaging platforms, transaction logs, customer information databases, device details, external data sources, and historical fraud data. The method includes executing multi-threaded downloaders to handle multiple data streams simultaneously, including queue and scheduler processes for managing and prioritizing downloading tasks. It involves storing the downloaded data in a repository comprising a high-capacity database designed to handle large volumes of unstructured data, including raw HTML content, email headers, bodies, attachments, transaction logs, and other relevant information.

The method also entails executing a web scraping agent to analyze and extract relevant features from the stored data, including parsing and identifying HTML elements, metadata, and other indicators to transform unstructured data into a structured data model suitable for machine learning analysis. Additionally, the method includes generating an after-processing dataset that includes a testing dataset and a training dataset for machine learning analysis, ensuring the data is properly partitioned for effective model training and validation.

The method involves evaluating multiple machine learning models, including Random Forest and Support Vector Machine (SVM) algorithms, using the testing dataset to determine their accuracy in predicting phishing attempts and account takeover fraud, involving rigorous testing, cross-validation, and performance metrics analysis to identify the best-performing models. It includes selecting one or more optimal machine learning models based on the evaluation results, ensuring the chosen models provide the highest predictive accuracy and reliability.

The method involves applying the selected machine learning models to generate phishing predictions from new data, using the trained models to classify incoming emails and messages as phishing or legitimate. The method includes performing feature extraction to identify specific attributes from the data that are most relevant for detecting phishing and account takeover fraud, including sender's email address, subject line, embedded hyperlinks, message body content, attachments, transaction anomalies, login locations, and device fingerprints. Furthermore, the method involves executing a machine learning algorithm to learn from the data and improve future predictions, where the machine learning algorithm continuously adapts to new phishing techniques and account takeover methods through ongoing training and updating of the model. The method includes generating a trained model representing the best-performing version of the machine learning algorithm, ensuring the model is optimized for high accuracy and reliability in detecting phishing and account takeover fraud.

Finally, the method involves integrating the trained model into the system's security infrastructure by setting up an API or script to process incoming emails, SMS messages, and transactions, where the API extracts features from these messages and transactions and passes them through the trained model for classification, enabling real-time analysis and detection. The method uses feature engineering to refine the data, involving the selection, manipulation, and transformation of raw data into useful features for supervised learning. It includes providing real-time processing to generate accurate predictions and timely alerts about potential phishing attempts, account takeover fraud, and unused code segments in software repositories. The method continuously monitors incoming data and transactions, flagging suspicious behavior in real-time to prevent unauthorized access and fraudulent transactions. It involves identifying and flagging unused code segments in software repositories, allowing developers to remove them, thereby optimizing build sizes and improving software performance and security. Finally, the method utilizes a continuous feedback loop to retrain the AI model using real-time decisioning feeds, enhancing the model's ability to adapt to new phishing techniques, account takeover methods, and changes in the codebase, ensuring long-term protection and efficiency.

The following description and claims, in conjunction with the drawings-all integral parts of this specification-will clarify various features and characteristics of the current technology. Like reference numerals in the figures correspond to similar parts, enhancing understanding of the technology's methods of operation and the functions of related structural elements, as well as the synergies and economies of their combinations. Some of the processes or procedures described here may be implemented, in whole or in part, as computer-executable instructions recorded on computer-readable media, configured as computer modules, or in other computer constructs. These steps and functionalities may be executed on a single device or distributed across multiple devices interconnected with one another. However, it is important to acknowledge that the drawings primarily serve for descriptive and illustrative purposes and are not intended to delineate the limits of the invention. Unless contextually evident, the singular forms of "a," "an," and "the" used throughout the specification and claims should be interpreted to include their plural counterparts.

BRIEF DESCRIPTION OF DRAWINGS

FIG. 5 contains sample pseudocode modules for web crawling, web scraping, Random Forest training, feature engineering, and integrating the model into a security system. It includes detailed steps for initializing components, web crawling, web scraping, training the model, and processing incoming messages.

DETAILED DESCRIPTION

Figure 1:
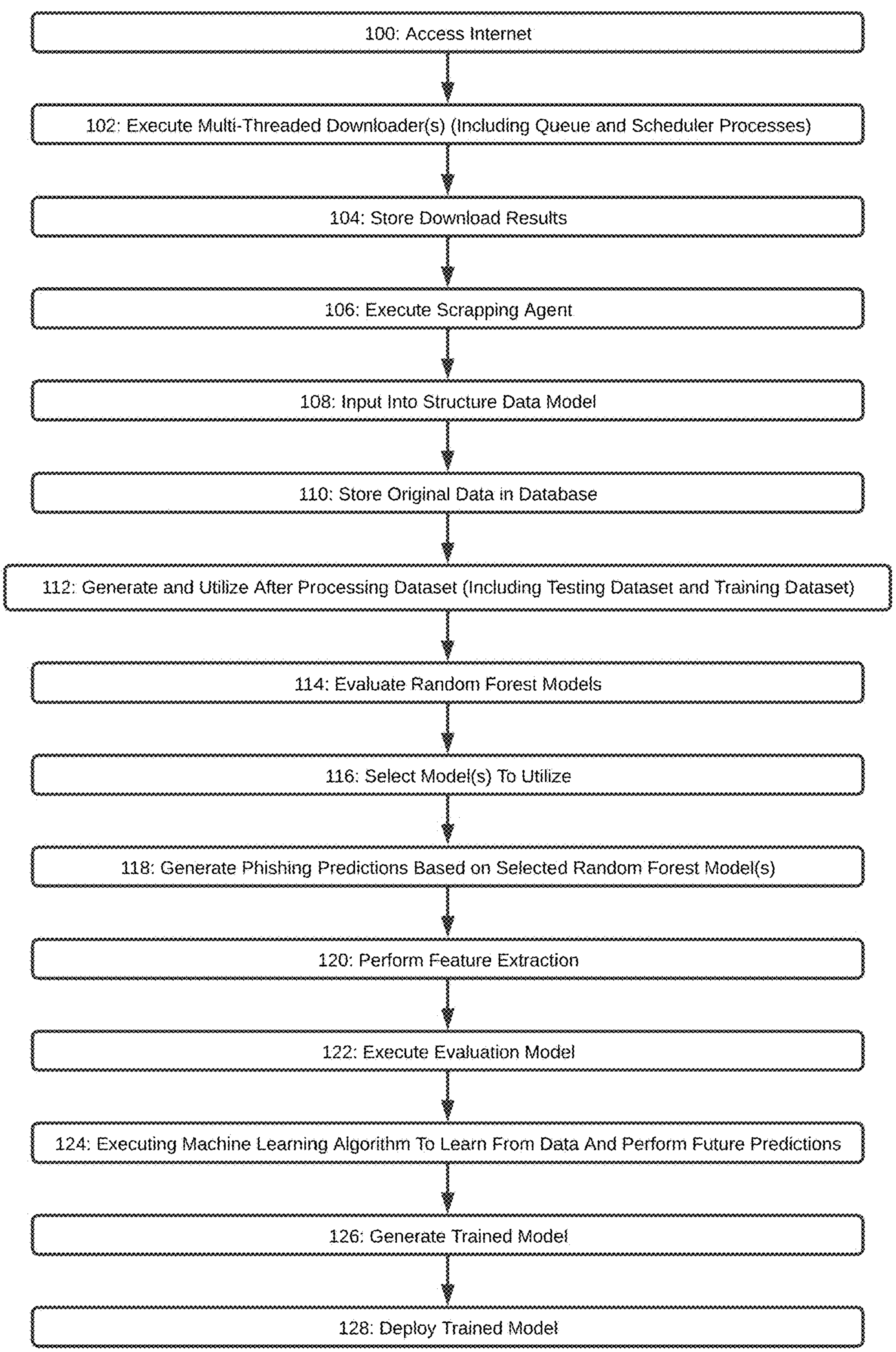
FIG. 1 illustrates a conceptual flow diagram for a phishing detection system, detailing steps from accessing the internet to deploying a trained model. It includes stages such as executing a multi-threaded downloader, storing data, evaluating Random Forest models, and generating phishing predictions.

In one aspect, at a high level, the invention presents an advanced solution to the pervasive problem of phishing, which poses significant risks to individuals and organizations by deceitfully obtaining sensitive information through malicious emails and messages. The invention combines several core inventive features and a comprehensive technical solution to effectively detect and prevent phishing attacks.

Some core inventive features of the invention include web crawling, web scraping, Random Forest algorithm training, feature engineering, and the integration of a trained AI model into a system's security infrastructure. Web crawling is utilized to systematically browse the internet and collect data from various sources, building and indexing a comprehensive database of phishing and legitimate email patterns. This data is then processed by a web scraping agent, which extracts relevant features from email content, headers, and attachments, transforming unstructured data into a structured format suitable for analysis.

The structured data is used to train a Random Forest algorithm, which creates an ensemble of decision trees to generate accurate predictions. The algorithm learns the relationships between different features and their target outcomes, improving its predictive accuracy through elections and averaging mechanisms. Feature engineering is employed to refine the extracted data, selecting, manipulating, and transforming it into useful features for supervised learning.

The trained AI model is integrated into the system's security infrastructure through an API or script that processes incoming emails and SMS messages. This integration allows the system to operate in real-time, continuously analyzing new data and improving its accuracy through feedback from actual phishing attempts and legitimate messages. The system extracts relevant features from incoming messages, passes them through the AI model for classification, and provides timely alerts to users about potential phishing threats.

The invention can be implemented in one or more various steps or components. The web crawler visits a wide range of websites, systematically browsing the internet to identify phishing and legitimate email patterns, building a comprehensive list, properly indexing it, and storing it in a database. A multi-threaded downloader collects data swiftly, adding it to a queue and scheduling indexing as needed. The collected data is fed into the web scraping agent, which extracts relevant features from email content, headers, and attachments, creating a structured representation of email characteristics. The structured data is used to train the Random Forest algorithm, which creates an ensemble of decision trees to improve predictive accuracy through votive electing and averaging. The trained AI model is integrated into the system's security infrastructure by setting up an API that processes incoming emails and SMS messages, extracting features and passing them through the AI model for classification. Feature engineering refines the data, extracting meaningful content crucial for the AI model's decision-making process. Real-time data processing ensures timely and accurate phishing alerts, with the Random Forest decision maker converting incoming data into subsets and making final decisions based on the aggregated results of multiple decision trees. A continuous feedback loop retrains the AI model using real-time decisioning feeds, allowing it to adapt to new phishing techniques and maintain its effectiveness over time.

Overall, the invention provides a robust, scalable, and adaptable solution to phishing detection and prevention, leveraging advanced technologies to protect users from evolving threats.

In another aspect, at a high level, additional embodiments and improvements are provided to focus on addressing two additional critical cybersecurity issues: preventing account takeover fraud and optimizing software repositories by identifying and removing unused code. This enhancement builds upon the original system designed for phishing detection by incorporating advanced data collection, feature engineering, and machine learning techniques.

The system can integrate data collection from a variety of sources beyond just emails and SMS messages. This includes transaction logs, customer information databases, device details, external data sources, and historical fraud data. By expanding the data sources, the system can build a more comprehensive and detailed dataset, which is essential for accurately detecting account takeover attempts and identifying unused code in repositories.

Feature engineering plays a pivotal role in this enhanced system. It involves creating new, meaningful features from the raw and refined data. For instance, in the context of account takeover fraud, features such as unusual login locations, atypical transaction amounts, and changes in device fingerprints are engineered. For software repository optimization, features might include code usage frequency, dependency analysis, and code complexity metrics. These features provide the machine learning models with the necessary context to make accurate predictions.

The system employs multiple machine learning models, including Random Forest and Support Vector Machine (SVM) algorithms. These models are trained and evaluated using the comprehensive datasets created through the data collection and feature engineering processes. The best-performing models are selected based on their predictive accuracy and reliability. These models are then deployed into production environments where they monitor incoming data in real-time.

For phishing detection and account takeover fraud prevention, the models analyze real-time communications and transactions. They flag suspicious activities, such as emails containing phishing links or transactions that deviate from the user's normal behavior patterns. This real-time monitoring is crucial for providing immediate alerts and preventing security breaches.

In terms of software repository optimization, the system continuously monitors codebases to identify and flag unused or redundant code. This helps in maintaining clean and efficient code repositories, reducing build sizes, and minimizing potential security vulnerabilities associated with obsolete code. The models used for this purpose analyze the usage patterns and dependencies within the codebase to accurately identify segments of code that are no longer needed.

The continuous learning and adaptation capability of the system ensures that it remains effective over time. As new data is collected and new patterns emerge, the system's models are retrained and updated. This continuous feedback loop allows the system to stay ahead of evolving cyber threats and maintain high levels of accuracy in detecting phishing attempts, preventing account takeover fraud, and optimizing software repositories.

By integrating these advanced techniques, the improved system offers robust protection against a broader range of cyber threats and enhances the efficiency of software development processes. This comprehensive approach ensures that users are safeguarded against evolving cybersecurity challenges while maintaining optimal software performance.

The description of various example embodiments herein is intended to achieve the goals previously outlined, referencing the illustrations included in this disclosure. These illustrations depict multiple systems and methods for implementing the disclosed information. It should be recognized that alternative implementations are possible, and modifications to both structure and functionality may be made. The description details various connections between elements, which should be interpreted broadly. Unless explicitly stated otherwise, these connections can be either direct or indirect and may be established through either wired or wireless methods. This document does not aim to restrict the nature of these connections.

Terms such as "computers," "machines," and similar phrases are used interchangeably based on the context to denote devices that may be general-purpose or specialized for specific functions, whether virtual or physical, and capable of network connectivity. This encompasses all pertinent hardware, software, and components known to those skilled in the field. Such devices might feature specialized circuits like application-specific integrated circuits (ASICs), microprocessors, cores, or other processing units for executing, accessing, controlling, or implementing various types of software, instructions, data, modules, processes, or routines. The employment of these terms within this document is not intended to restrict or exclusively refer to any specific type of electronic devices or components, and should be interpreted broadly by those with relevant expertise. For conciseness and assuming familiarity, detailed descriptions of computer/software components and machines are omitted.

Software, executable code, data, modules, procedures, and similar entities may reside on tangible, physical computer-readable storage devices. This includes a range from local memory to network-attached storage, and various other accessible memory types, whether removable, remote, cloud-based, or accessible through other means. These elements can be stored in both volatile and non-volatile memory forms and may operate under different conditions such as autonomously, on-demand, as per a preset schedule, spontaneously, proactively, or in response to certain triggers. They may be consolidated or distributed across multiple computers or devices, integrating their memory and other components. These elements can also be located or dispersed across network-accessible storage systems, within distributed databases, big data infrastructures, blockchains, or distributed ledger technologies, whether collectively or in distributed configurations.

The term "networks" and similar references encompass a wide array of communication systems, including local area networks (LANs), wide area networks (WANs), the Internet, cloud-based networks, and both wired and wireless configurations. This category also covers specialized networks such as digital subscriber line (DSL) networks, frame relay networks, asynchronous transfer mode (ATM) networks, and virtual private networks (VPN), which may be interconnected in various configurations. Networks are equipped with specific interfaces to facilitate diverse types of communications—internal, external, and administrative—and have the ability to assign virtual IP addresses (VIPs) as needed. Network architecture involves a suite of hardware and software components, including but not limited to access points, network adapters, buses, both wired and wireless ethernet adapters, firewalls, hubs, modems, routers, and switches, which may be situated within the network, on its edge, or externally. Software and executable instructions operate on these components to facilitate network functions. Moreover, networks support HTTPS and numerous other communication protocols, enabling them to handle packet-based data transmission and communications effectively.

As used herein, Generative Artificial Intelligence (AI) or the like refers to AI techniques that learn from a representation of training data and use it to generate new content similar to or inspired by existing data. Generated content may include human-like outputs such as natural language text, source code, images/videos, and audio samples. Generative AI solutions typically leverage open-source or vendor sourced (proprietary) models, and can be provisioned in many ways, including, but not limited to, Application Program Interfaces (APIs), websites, search engines, and chatbots. Most often, Generative AI solutions are powered by Large Language Models (LLMs) which were pre-trained on large datasets using deep learning with over 500 million parameters and reinforcement learning methods. Any usage of Generative AI and LLMs is preferably governed by an Enterprise AI Policy and an Enterprise Model Risk Policy.

Generative artificial intelligence models have been evolving rapidly, with various organizations developing their own versions. Sample generative AI models that can be used under various aspects of this disclosure include but are not limited to: (1) OpenAI GPT Models: (a) GPT-3: Known for its ability to generate human-like text, it's widely used in applications ranging from writing assistance to conversation. (b) GPT-4: An advanced version of the GPT series with improved language understanding and generation capabilities. (2) Meta (formerly Facebook) AI Models-Meta LLAMA (Language Model Meta AI): Designed to understand and generate human language, with a focus on diverse applications and efficiency. (3) Google AI Models: (a) BERT (Bidirectional Encoder Representations from Transformers): Primarily used for understanding the context of words in search queries. (b) T5 (Text-to-Text Transfer Transformer): A versatile model that converts all language problems into a text-to-text format. (4) DeepMind AI Models: (a) GPT-3.5: A model similar to GPT-3, but with further refinements and improvements. (b) AlphaFold: A specialized model for predicting protein structures, significant in biology and medicine. (5) NVIDIA AI Models-Megatron: A large, powerful transformer model designed for natural language processing tasks. (6) IBM AI Models-Watson: Known for its application in various fields for processing and analyzing large amounts of natural language data. (7) XLNet: An extension of the Transformer model, outperforming BERT in several benchmarks. (8) GROVER: Designed for detecting and generating news articles, useful in understanding media-related content. These models represent a range of applications and capabilities in generative AI. One or more of the foregoing may be used herein as desired. All are considered within the sphere and scope of this disclosure.

Generative AI and LLMs can be used in various parts of this disclosure performing one or more various tasks, as desired, including: (1) Natural Language Processing (NLP): This involves understanding, interpreting, and generating human language. (2) Data Analysis and Insight Generation: Including trend analysis, pattern recognition, and generating predictions and forecasts based on historical data. (3) Information Retrieval and Storage: Efficiently managing and accessing large data sets. (4) Software Development Lifecycle: Encompassing programming, application development, deployment, along with code testing and debugging. (5) Real-Time Processing: Handling tasks that require immediate processing and response. (6) Context-Sensitive Translations and Analysis: Providing accurate translations and analyses that consider the context of the situation. (7) Complex Query Handling: Utilizing chatbots and other tools to respond to intricate queries. (8) Data Management: Processing, searching, retrieving, and using large quantities of information effectively. (9) Data Classification: Categorizing and classifying data for better organization and analysis. (10) Feedback Learning: Processes whereby AI/LLMs improve performance based on feedback it receives. (Key aspects can include, for example, human feedback, Reinforcement Learning, interactive learning, iterative improvement, adaptation, etc.). (11) Context Determination: Identifying the relevant context in various scenarios. (12) Writing Assistance: Offering help in composing human-like text for various forms of writing. (13) Language Analysis: Analyzing language structures and semantics. (14) Comprehensive Search Capabilities: Performing detailed and extensive searches across vast data sets. (15) Question Answering: Providing accurate answers to user queries. (16) Sentiment Analysis: Analyzing and interpreting emotions or opinions from text. (17) Decision-Making Support: Providing insights that aid in making informed decisions. (18) Information Summarization: Condensing information into concise summaries. (19) Creative Content Generation: Producing original and imaginative content. (20) Language Translation: Converting text or speech from one language to another.

SMS (Short Message Service) and MMS (Multimedia Messaging Service) are both messaging protocols used for sending text and multimedia content over mobile networks. SMS is used for sending short text messages and is limited to 160 characters. It does not support multimedia content such as images, videos, or audio files and is widely used for basic text communication. On the other hand, MMS extends the capabilities of SMS by allowing the transmission of multimedia content. With MMS, users can send images, videos, audio files, and longer text messages without being limited to 160 characters. However, MMS requires a mobile data connection to send and receive multimedia content. In summary, while SMS is used for sending simple text messages, MMS allows for richer communication by enabling the sharing of various types of media. As used herein, SMS and MMS are used interchangeably, and the invention is intended to cover these and all other messaging protocols.

FIG. 1, by way of non-limiting disclosure, depicts a detailed conceptual flow diagram for a sophisticated phishing detection system that utilizes a combination of web crawling, web scraping, and machine learning algorithms to identify and combat phishing threats effectively. The process initiates at step 100, where the system accesses the internet to gather a wide array of data. This step lays the foundation for the subsequent data analysis and model training processes by ensuring that the system collects extensive and diverse data from various online sources.

At step 102, the system implements multi-threaded downloaders, which include queue and scheduler processes. These downloaders are designed to handle multiple data streams simultaneously, thus significantly increasing the efficiency and speed of data collection. The queue and scheduler processes manage the prioritization and organization of the downloading tasks, ensuring that the system can handle large volumes of data without bottlenecks or delays.

Following the downloading process, the data is stored at step 104. This step involves creating a repository of raw data, which serves as the primary source of information for further analysis. The raw data includes various types of content, such as email messages, SMS messages from platforms or the like, website content, and other relevant information that could indicate phishing activities.

The next stage, step 106, involves executing a scraping agent. The scraping agent is tasked with analyzing the downloaded data to extract relevant features that can be used to identify phishing attempts. This agent processes the data by breaking it down into smaller, more manageable components, such as email headers, bodies, and attachments. By doing so, the scraping agent transforms the unstructured raw data into a structured data model, which is created at step 108. This structured data model organizes the data into a format that is suitable for machine learning analysis, making it easier to identify patterns and anomalies indicative of phishing.

At step 110, both the original data and the newly structured data are stored in a database. This dual storage approach ensures that the system retains both the raw and processed data for future reference and further processing. The original data serves as a backup and a source for additional analysis if needed, while the structured data is used for immediate analysis and model training.

The system then generates an after-processing dataset at step 112. This dataset includes both a testing dataset and a training dataset. The testing dataset is used to evaluate the performance of the machine learning models, while the training dataset is used to train the models. These datasets are crucial for ensuring that the models are accurate and effective in predicting phishing attempts.

The core of the machine learning process begins at step 114, where Random Forest models are evaluated. This step involves testing various models to determine their accuracy and effectiveness in predicting phishing attempts. The evaluation process includes rigorous testing and validation to ensure that the models perform well under different conditions and with different types of data.

Based on the evaluation results, the most suitable model(s) are selected at step 116. The selection process involves comparing the performance of different models and choosing the ones that provide the best predictive accuracy and reliability. Once the optimal model is selected, it is used to generate phishing predictions at step 118. This involves applying the model to new data to predict whether an email or message is likely to be a phishing attempt.

To enhance the model's accuracy, feature extraction is performed at step 120. This step involves identifying and isolating specific attributes from the data that are most relevant for detecting phishing. Feature extraction helps to refine the data and improve the model's predictive capabilities by focusing on the most significant indicators of phishing.

At step 122, an evaluation model is executed to assess the performance of the feature extraction and the overall predictive accuracy of the system. This evaluation involves a detailed analysis of how well the system can identify phishing attempts based on the extracted features. The evaluation model helps to identify any areas for improvement and ensures that the system remains effective over time.

The machine learning algorithm is then executed at step 124, where it learns from the data to continually improve its future predictions. This step is essential for adapting to new phishing techniques and evolving threats. By continuously learning from new data, the machine learning algorithm ensures that the system remains up-to-date and effective in detecting phishing.

The culmination of the training and evaluation processes is the generation of a trained model at step 126. This model represents the best-performing version of the machine learning algorithm, having been trained and validated on extensive datasets. The trained model is then deployed at step 128, integrating it into the system's security infrastructure. Deployment ensures that the model can be used in real-time to analyze incoming emails and messages, providing immediate phishing detection and alerts.

Throughout this entire process, FIG. 1 showcases the meticulous design and comprehensive nature of the phishing detection system. Each step in the flow diagram is carefully orchestrated to ensure that the system remains robust, scalable, and adaptable to the ever-evolving landscape of phishing threats. By combining advanced techniques in web crawling, web scraping, and machine learning, the system is capable of delivering accurate and reliable phishing detection, effectively protecting users from potential fraud, and enhancing overall cybersecurity.

Figure 2:
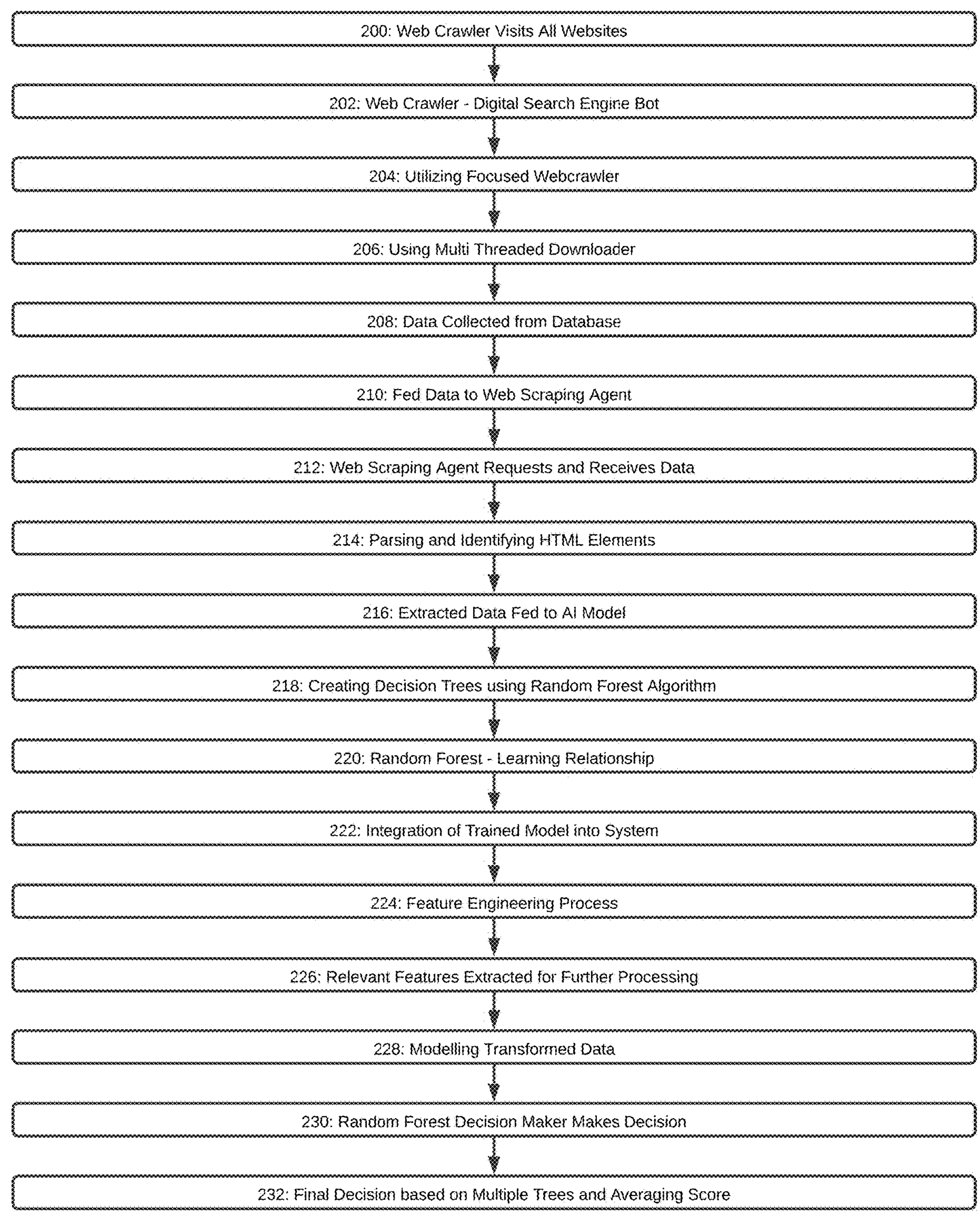
FIG. 2 shows a process flow for the technical solution involving a web crawler visiting websites, collecting data, web scraping, and using a Random Forest algorithm to create decision trees. The diagram highlights the integration of the trained model into the system and the feature engineering process.

FIG. 2, by way of non-limiting disclosure, provides an expansive and intricate view of the process flow for a sophisticated phishing detection system that integrates web crawling, web scraping, and machine learning. This flow begins at step 200, where a web crawler is deployed to visit all websites systematically. The web crawler, denoted as a digital search engine bot at step 202, performs comprehensive scans of the internet, uncovering a vast array of web pages and other online content that may potentially harbor phishing threats.

At step 204, the system employs a focused web crawler that can target specific types of content most likely to include phishing attempts. This approach ensures the web crawler efficiently collects data pertinent to phishing, thereby enhancing both the speed and relevance of the data gathering process. To further optimize data acquisition, the system utilizes a multi-threaded downloader at step 206. This multi-threaded downloader operates concurrently, handling multiple download tasks simultaneously. This concurrency allows the system to gather vast amounts of data swiftly and manage these downloads through queue and scheduler processes, ensuring seamless data flow and preventing bottlenecks.

Once the data is gathered, it is stored in a database at step 208. This step creates a repository of raw data that will be used for subsequent analysis and processing. At step 210, the collected data is fed to a web scraping agent, which is responsible for requesting and receiving data from the database to begin the extraction of relevant features. The web scraping agent, in step 214, meticulously parses and identifies HTML elements within the web pages and emails. This parsing process involves breaking down the HTML code into its fundamental components such as text, images, links, and metadata, allowing the system to isolate the specific elements that are indicative of phishing activities.

The parsed and identified data is then transferred to an AI model at step 216. This AI model is specifically trained to recognize phishing patterns by analyzing structured data. At step 218, the system employs a Random Forest algorithm to create decision trees. This ensemble method involves generating multiple decision trees from different subsets of the data, each tree representing a different possible outcome based on the input data. The Random Forest algorithm improves predictive accuracy by considering the aggregate results of these numerous decision trees, which helps in identifying complex patterns and correlations within the data.

The learning process continues at step 220, where the Random Forest algorithm learns the intricate relationships between the various features extracted from the data and their respective target outcomes. This learning process enhances the model's ability to detect phishing attempts by continually refining its predictive capabilities. Once the AI model is thoroughly trained, it is integrated into the system at step 222. This integration involves setting up the necessary infrastructure, such as APIs and scripts, to deploy the model so that it can operate in real-time within the system's security framework.

Feature engineering, a critical component, occurs at step 224. This step involves selecting, manipulating, and transforming raw data into meaningful features that improve the model's ability to learn and make accurate predictions. The extracted features undergo further refinement at step 226 to identify the most relevant indicators of phishing, ensuring that the data fed into the AI model is both high-quality and highly informative.

At step 228, the refined data is modeled to transform it into a structured representation that the Random Forest decision maker can analyze. This step is vital as it ensures that the data is in an optimal format for decision-making processes. The Random Forest decision maker, at step 230, uses the structured data to make informed decisions. This involves classifying emails and messages as either phishing attempts or legitimate communications.

The decision-making process is carried out at step 232. Here, the system aggregates the results from multiple decision trees and calculates an average score to arrive at a final decision. This aggregation process helps to ensure that the classification is robust, minimizing the likelihood of false positives (legitimate emails wrongly flagged as phishing) and false negatives (phishing emails not detected). By averaging the decisions from multiple trees, the system provides a more accurate and reliable classification of potential phishing threats.

Throughout the entire process depicted in FIG. 2, the system leverages advanced techniques to ensure comprehensive phishing detection and prevention. From the initial web crawling that collects extensive data, to the intricate parsing and feature extraction by the web scraping agent, to the sophisticated machine learning algorithms that analyze and predict phishing attempts, every step is meticulously designed to enhance the system's overall effectiveness.

The integration of these technologies ensures that the system remains adaptable to new and evolving phishing tactics. As phishing strategies become more sophisticated, the system's continuous learning and feature engineering processes allow it to stay ahead of potential threats, providing real-time protection to users. The detailed and rigorous approach outlined in FIG. 2 highlights the robustness and scalability of the system, demonstrating its capability to handle large volumes of data and deliver precise phishing alerts, thereby safeguarding sensitive information against fraudulent attacks.

Figure 3:
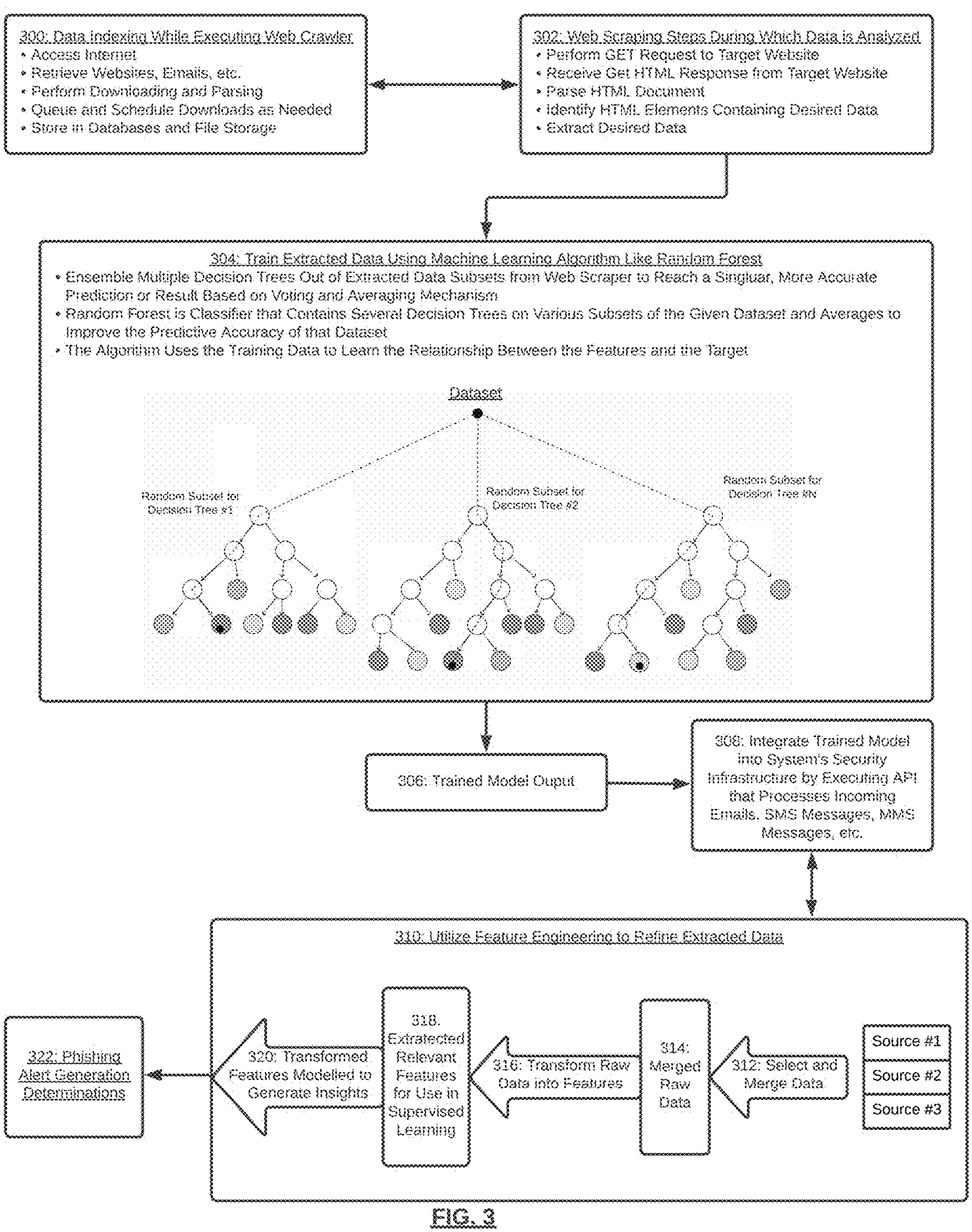
FIG. 3 depicts a block diagram for the technical solution, illustrating data indexing, web scraping, training using a Random Forest algorithm, and integrating the trained model into the system's security infrastructure. It includes steps like feature engineering, phishing alert generation, and model output.

FIG. 3, by way of non-limiting disclosure, provides a comprehensive block diagram of the technical solution for a sophisticated phishing detection system. This diagram outlines the extensive processes involved in indexing data, scraping web content, training machine learning models, and ultimately integrating these models into a security infrastructure to detect phishing threats in real time. The process initiates at step 300, where data indexing occurs concurrently with the execution of the web crawler. During this stage, the system gains access to the internet and systematically retrieves a vast array of websites, emails, messages, and other relevant content that may be indicative of phishing activities. The web crawler operates by downloading and parsing this data, efficiently managing the flow of information by adding it to queues and scheduling downloads as required. This organized approach ensures that data retrieval is continuous and seamless, maintaining a steady influx of information into the system.

After the data is downloaded, it is stored in databases and file storage systems, creating a comprehensive and accessible repository for subsequent analysis. This initial phase lays the groundwork for the entire phishing detection process, providing the raw data that will be transformed and analyzed in the following steps.

Step 302 delves into the web scraping phase, where the collected data undergoes thorough analysis. The process begins with the system performing a GET request to the target website, a fundamental method used to request data from a specified resource. Upon receiving the HTML response from the target website, the system meticulously parses the HTML document. This parsing process involves a detailed examination of the HTML structure to identify specific tags and attributes that are indicative of phishing content. By dissecting the HTML code, the system can pinpoint elements such as links, text, images, and metadata that are relevant to phishing detection. The identified data is then extracted, transforming the raw, unstructured HTML data into a structured format. This structured format is critical as it organizes the data into a coherent and analyzable form, making it suitable for further machine learning analysis.

In step 304, the focus shifts to training the extracted data using a machine learning algorithm, specifically the Random Forest algorithm. This step is a cornerstone of the system as it involves the creation of an ensemble of multiple decision trees from the data subsets extracted by the web scraper. The Random Forest algorithm enhances predictive accuracy by combining the outputs of various decision trees. Each tree in the ensemble is trained on different subsets of the data (including randomized subsets), and their predictions are aggregated through a votive electing and averaging mechanism. This ensemble approach ensures that the model benefits from diverse perspectives, improving its overall robustness and accuracy. The Random Forest algorithm learns the intricate relationships between the features of the data and the target outcomes, enabling it to make highly accurate predictions about whether an email or message is a phishing attempt.

The output of this training process is represented at step 306, where the results of the model's predictions are documented. These results form the basis for identifying potential phishing threats. The trained model is then integrated into the system's security infrastructure at step 308. This integration involves deploying the trained model so that it can operate in real time, analyzing incoming communications as they are received. The deployment typically involves executing an API that processes incoming emails, SMS messages, MMS messages, and other types of communications. The API leverages the trained model to provide immediate phishing detection and alerts, offering real-time protection against phishing attacks.

Step 310 highlights the importance of feature engineering in refining the extracted data. Feature engineering is a sophisticated process that involves selecting, manipulating, and transforming raw data into features that can significantly enhance the performance of machine learning models. This step ensures that the data used by the model is of the highest quality, making the predictions more accurate and reliable. By carefully engineering features, the system can better capture the nuances and patterns that indicate phishing activities.

In step 312, the system selects and merges data from various sources to create a more comprehensive and informative dataset. This step enriches the dataset with diverse information, which enhances the model's learning capabilities. The merged raw data is depicted at step 314, showcasing the integration of multiple data sources into a unified dataset. This unified dataset serves as a rich resource for training and evaluating the machine learning model.

Step 316 involves transforming the raw data into features that the machine learning model can use. This transformation process includes data cleaning, feature selection, and conversion of the data into a suitable format for analysis. The transformation ensures that the data fed into the model is coherent, relevant, and optimized for learning. The relevant features extracted during this process are depicted at step 318, highlighting the specific attributes that have been isolated for use in supervised learning.

At step 320, the transformed features are modeled to generate insights. This modeling process applies statistical and machine learning techniques to analyze the features and identify patterns that indicate phishing. The insights generated from this modeling process enhance the predictive capabilities of the model. These insights help the model to understand the underlying patterns in the data, making it more effective at detecting phishing attempts.

The generation of phishing alert determinations is depicted at step 322. In this step, the trained model is used to analyze incoming communications and determine whether they are phishing attempts. When a potential phishing threat is detected, the system generates an alert to notify the user, providing immediate protection against fraudulent activities. This real-time detection and alert mechanism is vital for safeguarding users against phishing attacks, ensuring that they are promptly informed of any potential threats.

The alert may be a separate notification to the user of a phishing attempt or may annotate existing email user interfaces or SMS/MMS messaging interfaces to flag legitimate communications or potential phishing threats.

The alert system is designed to provide users with immediate and clear notifications regarding potential phishing threats. When a potential phishing attempt is detected, the system can generate alerts in various forms to ensure users are promptly informed and can take appropriate action.

One form of alert is a separate notification that appears as a pop-up or push notification on the user's device. This notification will clearly indicate that a phishing attempt has been detected and may include details such as the sender's information, the subject of the email or message, and a brief explanation of why the communication is suspected to be a phishing attempt. The notification might also provide recommendations for the user, such as not clicking on any links, not downloading attachments, or marking the email as spam.

If desired, the alert system can integrate directly with existing email user interfaces or SMS/MMS messaging interfaces. In this case, the alert could manifest as an annotation or flag next to the suspected phishing communication. For example, within an email client, the subject line or sender's address might be highlighted in a different color, or a warning icon could be displayed next to the email. The body of the email could also include a banner at the top, indicating that the message is suspected to be a phishing attempt. Similarly, in SMS/MMS interfaces, a suspected message could be flagged with a warning icon or highlighted to draw the user's attention.

The system may also provide additional contextual information within the alert. This could include specifics about the phishing characteristics detected, such as known phishing keywords, suspicious URLs, mismatched domains, or unusual metadata. Furthermore, the alert might offer options for users to report the phishing attempt to their email provider or security team, block the sender, or move the email to a quarantine folder for further inspection.

By offering both standalone notifications and integrated interface alerts, the system ensures that users are consistently and effectively warned about potential phishing threats. This comprehensive alert mechanism not only enhances the user's ability to recognize and avoid phishing attacks but also contributes to a safer digital environment by mitigating the risks associated with phishing attempts.

Throughout the entire process depicted in FIG. 3, the system leverages advanced web crawling, web scraping, and machine learning techniques to build a robust and effective phishing detection solution. Each step is meticulously designed to ensure that the system can handle large volumes of data, extract meaningful features, and make accurate predictions about phishing attempts. By integrating these technologies, the system provides comprehensive protection against phishing, safeguarding sensitive information and enhancing overall cybersecurity. This detailed and expansive process flow underscores the system's ability to adapt to evolving phishing tactics, offering continuous and reliable protection in an ever-changing threat landscape.

Figure 4:
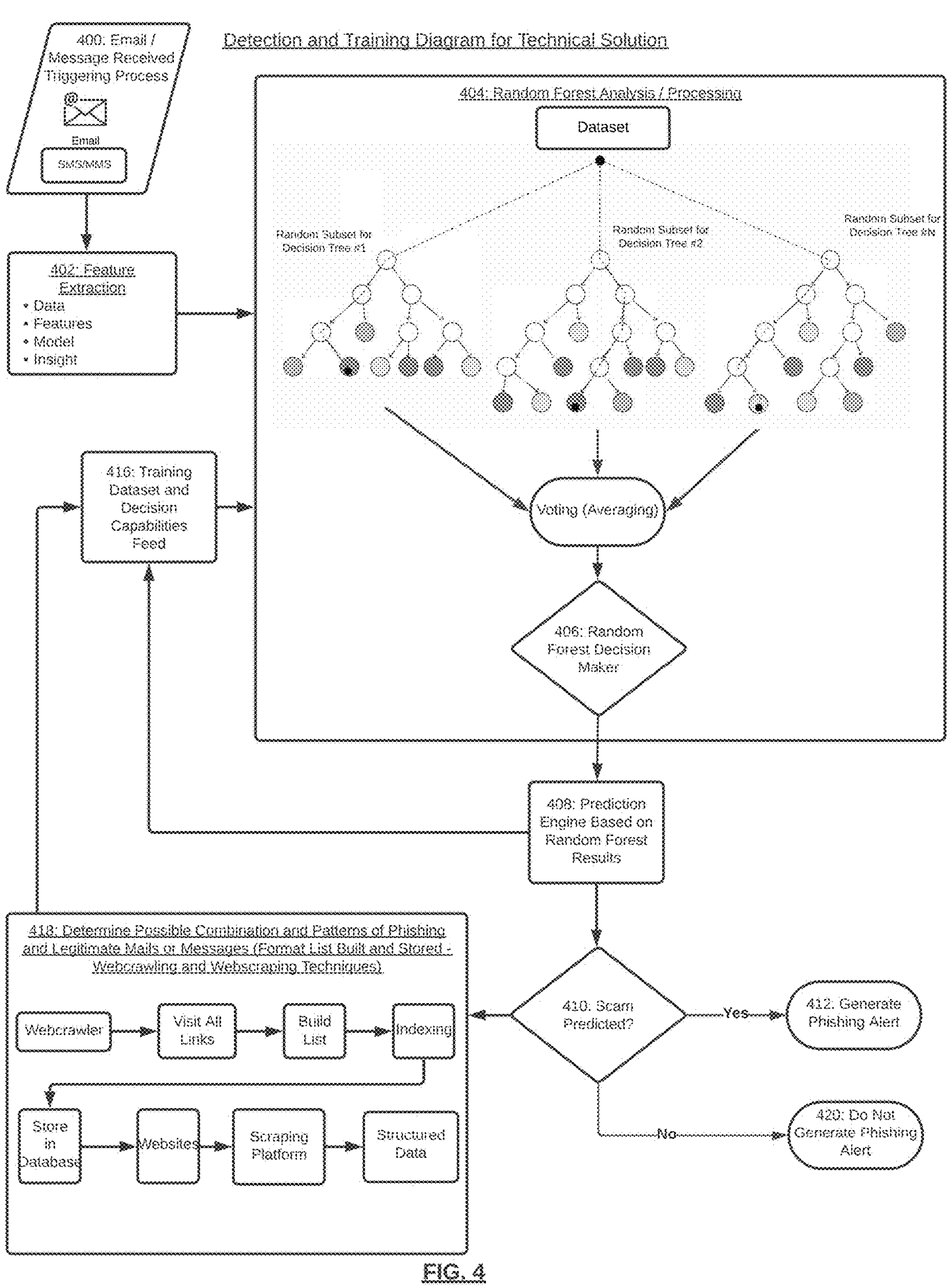
FIG. 4 presents a detection and training diagram, starting with an email or message triggering the process. It involves feature extraction, Random Forest analysis, prediction based on the Random Forest results, and generating phishing alerts if a scam is predicted.

FIG. 4, by way of non-limiting disclosure, provides an in-depth look at the detection and training diagram for the phishing detection system, showcasing the intricate steps involved in identifying phishing threats, analyzing data, and generating alerts. The process is initiated at step 400, where an email or message is received. This incoming communication, whether it be an email, SMS, or MMS, triggers the phishing detection process. The system is designed to immediately begin analyzing the content of the message to determine its legitimacy.

The first significant stage in this process is feature extraction, which occurs at step 402. During feature extraction, the system meticulously examines the incoming message to identify and extract relevant features. These features include various elements such as the sender's email address, subject line, embedded hyperlinks, message body content, and any attachments. The extraction process involves parsing the email or message to break it down into its constituent parts, transforming the raw, unstructured data into structured data that can be analyzed more effectively.

Once the features have been extracted, the system moves on to the Random Forest analysis and processing stage at step 404. Here, the Random Forest algorithm is employed to analyze the structured data. The Random Forest algorithm is a powerful machine learning technique that involves creating an ensemble of multiple decision trees. Each tree in the forest is trained on different subsets of the data, allowing the algorithm to consider various perspectives and correlations within the features. The Random Forest algorithm works by having each decision tree independently assess whether the message is phishing. The results from these individual trees are then aggregated through a votive electing mechanism, where each tree casts a ballot on the classification of the message. The final prediction is made by averaging these ballots, which enhances the accuracy and reliability of the detection process.

The decision-making process is overseen by the Random Forest decision maker, depicted at step 406. This component takes the averaged results from the ensemble of decision trees and makes a final determination about the legitimacy of the message. If the majority of the decision trees indicate that the message is likely a phishing attempt, the system concludes that it is indeed phishing. Conversely, if the majority of the trees classify the message as legitimate, the system deems it safe.

The prediction engine, shown at step 408, processes the results from the Random Forest decision maker to produce a final verdict on the message. This engine applies the learned patterns and rules from the Random Forest algorithm to make a decisive prediction. At step 410, the system evaluates the outcome to answer the critical question: "Is a scam predicted?" This evaluation is pivotal in determining the subsequent actions taken by the system.

If the prediction engine concludes that the message is a phishing attempt, the system advances to step 412. In this step, a phishing alert is generated. This alert is designed to notify the user immediately about the potential threat, providing them with crucial information to avoid falling victim to the phishing attack. The alert typically includes details about why the message was flagged as phishing, helping the user understand the potential risks.

In cases where the prediction engine determines that the message is legitimate, the system proceeds to step 420, where it decides not to generate a phishing alert. This decision is crucial for minimizing false positives and ensuring that users are not unnecessarily disturbed by warnings about benign messages.

The system's training process is detailed at step 416, where the training dataset and decision capabilities feed into the Random Forest algorithm. This ongoing training process is essential for maintaining and improving the model's accuracy. By continuously incorporating new data, the model learns from both phishing and legitimate messages, enhancing its ability to detect new and evolving phishing techniques. The continuous learning mechanism allows the model to adapt to changes in phishing strategies, ensuring that it remains effective over time.

Step 418 highlights the process of determining possible combinations and patterns of phishing and legitimate messages. This involves using web crawling and web scraping techniques to build and store a format list. The system can continuously update this list (if desired) by visiting various websites, indexing content, and storing structured data in a database. This comprehensive database serves as a valuable reference for the system, enabling it to recognize known phishing tactics and differentiate them from legitimate communication patterns.

The web crawler visits numerous links and pages, systematically gathering data that is then processed and stored. This data collection process is crucial for expanding the system's knowledge base and improving its detection capabilities. By continuously updating the database with new examples of phishing and legitimate messages, the system enhances its ability to detect and prevent phishing attacks.

Throughout the entire process depicted in FIG. 4, the system leverages advanced machine learning techniques and real-time data analysis to provide robust phishing detection. The detailed steps ensure that every incoming message is thoroughly analyzed, with the Random Forest algorithm playing a central role in making accurate and reliable predictions. By integrating feature extraction, machine learning, and real-time alert generation, the system offers comprehensive protection against phishing, safeguarding users' sensitive information.

The continuous feedback and training mechanism ensure that the system adapts to new phishing tactics, maintaining its effectiveness in an ever-evolving threat landscape. This adaptive capability is critical for staying ahead of cybercriminals who continually develop more sophisticated phishing techniques. The comprehensive approach detailed in FIG. 4 demonstrates the system's robust design and its ability to provide reliable, real-time protection against phishing threats.

FIG. 5, by way of non-limiting disclosure, provides an in-depth illustration of the technical implementation of the phishing detection system, detailing each component through sample pseudocode. This diagram begins with the web crawling functionality, represented by the WebCrawler class at step 500. The WebCrawler component is designed to systematically visit a wide array of websites to gather pertinent data. The _init_method initializes the WebCrawler functionality, setting up essential infrastructure, including establishing a connection to a database where the collected data will be stored.

The crawl method is central to this module, as it is responsible for initiating the data collection process by visiting all the websites listed in the get_all_websites method. This method returns a comprehensive list of URLs that the crawler is programmed to visit. For each website in this list, the index_website method is invoked, handling the downloading of the site's content and the extraction of relevant metadata.

Within the index_website method, the download_content method is used to retrieve the content of a given website. This involves making HTTP requests to the website and downloading the HTML and associated resources. Following this, the extract_metadata method analyzes the downloaded content to extract metadata, such as the length of the content, the number of hyperlinks, and whether the content contains any attachments. The content and metadata are then structured into a dictionary format, combining the website URL, the content itself, and the extracted metadata. This structured data is stored using the Database class.

The Database component, also part of web crawling functionality, features methods designed to facilitate the storage of collected data in a persistent storage system. The store method appends this data to an internal storage list, ensuring that the collected information is readily available for subsequent processing stages.

Transitioning to the web scraping phase, depicted by the WebScraper class at step 502, the system processes the data collected by the WebCrawler. The _init_method in the WebScraper component sets up a connection to the database and initializes an empty list to hold structured data. The scrape method iterates through the stored data in the database, calling the extract_features method on each data item to identify and extract relevant features.

The extract_features method in the WebScraper component is pivotal as it analyzes the collected data, extracting pertinent features such as the length of the content, the number of links within the content, and the presence of attachments. These extracted features are then stored in the structured_data list, making them available for further analysis.

Next, the Random Forest training process is outlined in the AIModel component at step 504. This class utilizes the RandomForestClassifier from the sklearn.ensemble module, a powerful machine learning algorithm. The _init_method initializes the AIModel component, setting up the Random Forest model and initializing lists to hold the training data and corresponding labels. The train method trains the Random Forest model on the extracted features and their labels, using the model.fit method to enable the model to learn the relationships between the features and the target labels.

The predict method in the AIModel component uses the trained model to predict whether new features indicate a phishing attempt. This method takes the input features and applies the trained Random Forest model to make a prediction, determining the likelihood of the input being a phishing attempt.

Feature engineering, a step in refining the data, is represented by the FeatureEngineering component at step 506. This is responsible for transforming raw data into structured features that the machine learning model can use effectively. The transform method in this component selects, manipulates, and converts raw data into a structured format, extracting meaningful attributes such as the length of the email content, the number of hyperlinks, and the presence of attachments. These transformed features are then compiled into a dictionary format, making them ready for use by the AI model.

The integration of the trained AI model into the system's security infrastructure is managed by the SecuritySystem component at step 508. The _init_method in this module initializes the AIModel and FeatureEngineering components. The process_incoming_message method is a function that takes an incoming message, applies feature engineering to extract relevant features, and then uses the AI model to predict whether the message is phishing. If the prediction indicates that the message is a phishing attempt, the alert_user method is invoked to notify the user about the potential threat.

Step 510 demonstrates how all these components work together cohesively to form a comprehensive phishing detection system. Initially, the database, web crawler, web scraper, and security system components are initialized. The web crawler begins the data collection process by visiting websites and storing the collected data in the database. Subsequently, the web scraper processes this data to extract meaningful features, which are used to train the Random Forest model.

The trained model is then integrated into the security system, which processes incoming messages by applying feature engineering to extract features and using the AI model to classify the messages. If a message is classified as phishing, the system alerts the user, providing immediate protection against phishing threats. This seamless integration of data collection, processing, and machine learning ensures that the system operates efficiently and accurately, offering robust protection against phishing attacks.

The pseudocode modules, functions, and components in FIG. 5 provide a detailed and clear representation of the system's workflow, highlighting the seamless integration of web crawling, web scraping, feature engineering, and machine learning to deliver an effective phishing detection solution. It is meticulously designed to ensure the system operates efficiently and accurately, offering robust protection against phishing threats by leveraging advanced data processing and machine learning techniques.

By providing such a detailed view of the system's components and their interactions, FIG. 5 underscores the comprehensive nature of the phishing detection solution. It highlights how each part of the system contributes to the overall goal of identifying and mitigating phishing threats. The use of advanced techniques in web crawling, web scraping, feature engineering, and machine learning ensures that the system remains adaptable and effective in the face of evolving phishing tactics, providing continuous and reliable protection for users.

Figure 6:
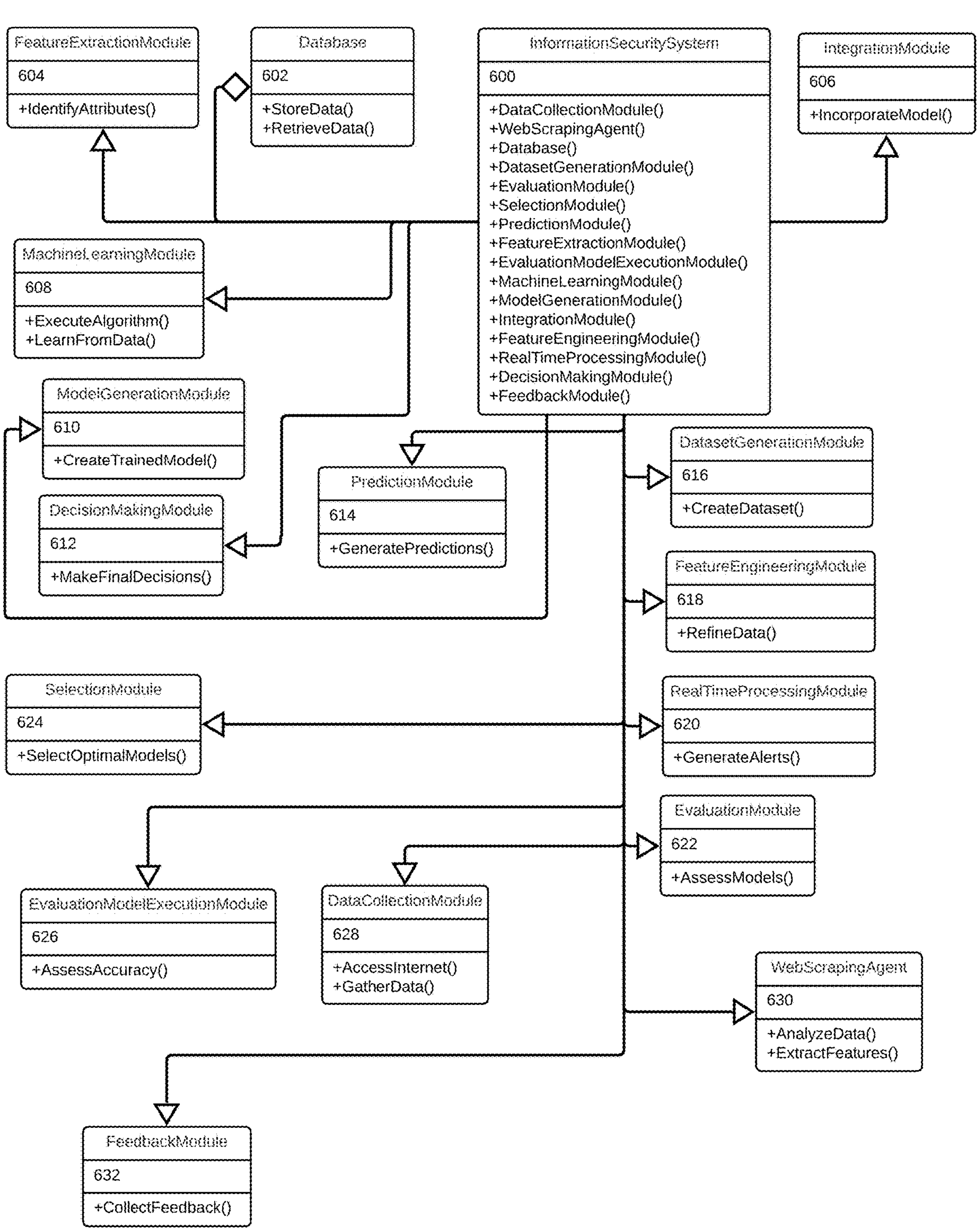
FIG. 6 illustrates a sample class diagram for an information security system designed for detecting phishing emails and SMS messages. The system includes various modules such as a Data Collection Module, Web Scraping Agent, Database, Dataset Generation Module, Evaluation Module, Selection Module, Prediction Module, Feature Extraction Module, Evaluation Model Execution Module, Machine Learning Module, Model Generation Module, Integration Module, Feature Engineering Module, Real-Time Processing Module, Decision-Making Module, and Feedback Module.

By way of non-limiting reference, FIG. 6 illustrates an information-security system for detecting phishing emails and text messages (including SMS, MMS, and other messaging protocols), comprising multiple interconnected modules and their specific functions as depicted in the class diagram. The system begins with a data collection module (628) configured to access the internet to gather data from various online sources, including websites, email servers, and messaging platforms. The data collection module operates continuously to ensure up-to-date information is collected for analysis, utilizing functions such as +AccessInternet( ) and +GatherData( ).

Within this module, multi-threaded downloaders are designed to handle multiple data streams simultaneously, incorporating advanced queue and scheduler processes for managing and prioritizing downloading tasks. This ensures efficient and timely data collection without bottlenecks or delays by dynamically adjusting to network conditions and data source availability. The functions within the multi-threaded downloaders include queuing mechanisms and scheduling algorithms that optimize the data collection process.

The downloaded data is stored in a high-capacity database (602), designed to handle large volumes of unstructured data, including raw HTML content, email headers, bodies, attachments, and metadata. The repository includes capabilities for indexing and cataloging the data for quick retrieval and analysis, using functions such as +StoreData( ) and +RetrieveData( ) This ensures that data is easily accessible for subsequent processing stages.

A web scraping agent (630) is configured to analyze and extract relevant features from the stored data. This agent parses and identifies HTML elements, metadata, and other indicators using natural language processing and pattern recognition techniques to transform unstructured data into a structured data model suitable for machine learning analysis. The functions of the web scraping agent include+AnalyzeData( ) and +ExtractFeatures( ) which systematically process the raw data into a usable format.

Both the original unstructured data and the newly created structured data are stored in the database (602), ensuring that the system retains comprehensive records for further analysis and reference, with secure storage mechanisms to protect sensitive information. This dual storage approach ensures data integrity and facilitates efficient querying for later stages.

The system includes a dataset generation module (616) configured to create an after-processing dataset that includes both a testing dataset and a training dataset for machine learning analysis. This module ensures that the data is properly partitioned to facilitate effective model training and validation, using stratified sampling techniques to maintain data representativeness. The function+CreateDataset( ) is responsible for this partitioning process.

An evaluation module (622) is provided to assess multiple Random Forest models using the testing dataset to determine their accuracy in predicting phishing attempts. This involves rigorous testing, cross-validation, and performance metrics analysis, including precision, recall, F1 score, and area under the ROC curve, to identify the best-performing models. The module employs the function+AssessModels( ) to evaluate model performance comprehensively.

A selection module (624) is configured to choose one or more optimal Random Forest models based on the evaluation results. This ensures that the chosen models provide the highest predictive accuracy and reliability for phishing detection by considering model stability and generalizability. The function+SelectOptimalModels( ) is used to perform this selection process.

The system includes a prediction module (614) configured to apply the selected Random Forest models to generate phishing predictions from new data. This module uses the trained models to classify incoming emails and messages as phishing or legitimate, providing detailed probability scores and classification explanations for each prediction. The function+GeneratePredictions( ) is integral to this module's operation.

A feature extraction module (604) is configured to identify specific attributes from the data that are most relevant for detecting phishing. These attributes include but are not limited to the sender's email address, subject line, embedded hyperlinks, message body content, attachments, email send time, domain reputation, and language patterns. The function+IdentifyAttributes( ) is used to isolate these critical features.

An evaluation model execution module (626) is configured to assess the accuracy of the feature extraction process and the overall predictive performance of the system. This module uses statistical analysis and validation techniques to ensure that the extracted features contribute meaningfully to the detection process, employing the function+AssessAccuracy( ).

The system includes a machine learning module (608) configured to execute a machine learning algorithm to learn from the data and improve future predictions. The machine learning algorithm continuously adapts to new phishing techniques through ongoing training and updating of the model, utilizing techniques such as incremental learning and transfer learning to maintain model relevance. The functions +ExecuteAlgorithm( ) and +LearnFromData( ) facilitate this adaptive learning process.

A model generation module (610) is configured to create a trained model representing the best-performing version of the machine learning algorithm. This ensures that the model is optimized for high accuracy and reliability in phishing detection by performing hyperparameter tuning and model optimization. The function +CreateTrainedModel( ) is responsible for generating this optimized model.

An integration module (606) is configured to incorporate the trained model into the system's security infrastructure by setting up an API or script to process incoming emails and SMS messages. The API extracts features from these messages and passes them through the trained model for classification, enabling real-time analysis and detection. The function+IncorporateModel( ) ensures seamless integration, while automated alert mechanisms for phishing attempts are also included.

The system includes a feature engineering module (618) configured to refine the data, involving the selection, manipulation, and transformation of raw data into useful features for supervised learning. This ensures that the data fed into the model is of the highest quality by applying techniques such as normalization, scaling, and dimensionality reduction. The function+RefineData( ) enhances data quality.

A real-time processing module (620) is provided to generate accurate predictions and timely alerts about potential phishing threats. This ensures that users receive immediate notifications about suspicious activities, with customizable alert settings and integration with existing security systems. The function+GenerateAlerts( ) supports real-time threat detection and user notification.

The system includes a decision-making module (612) configured to make final decisions based on the aggregated results of multiple decision trees from the Random Forest algorithm. This ensures reliable and precise classification of messages as phishing or legitimate by averaging the results from the decision trees and providing confidence scores for each classification. The function+MakeFinalDecisions( ) is used for this decision-making process.

A feedback module (632) is configured to utilize a continuous feedback loop to retrain the AI model using real-time decisioning feeds. This enhances the model's ability to adapt to new phishing techniques and maintain its effectiveness over time, ensuring long-term protection against evolving threats. The function+CollectFeedback( ) enables this continuous improvement process by incorporating feedback from user interactions and system performance metrics.

Overall, FIG. 6 presents a comprehensive information-security system with interconnected modules, each performing specific functions to detect and mitigate phishing threats effectively. The detailed functions within each module ensure the system operates efficiently, accurately, and adaptively in response to new phishing techniques.

Figure 7:
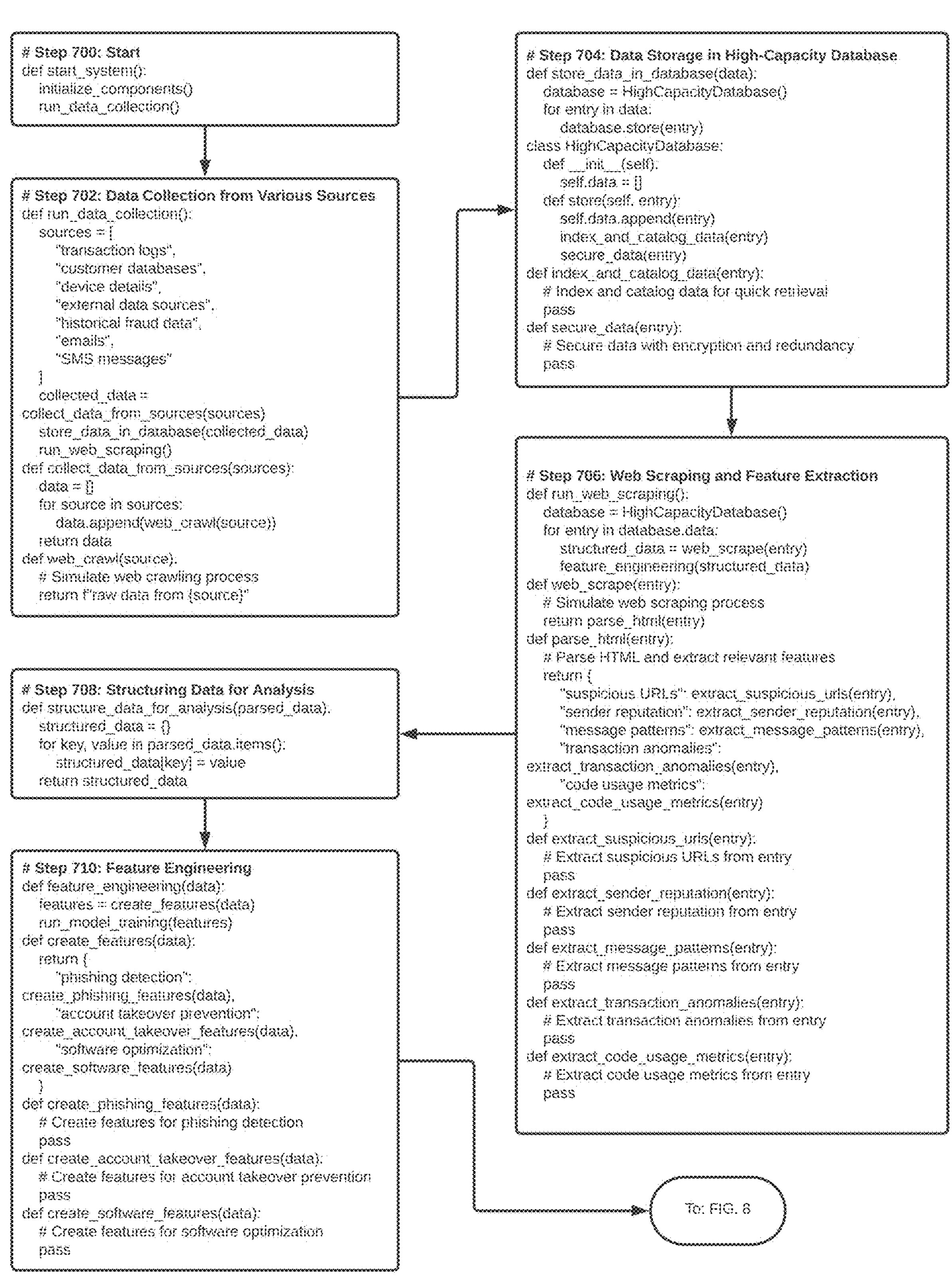
FIGS. 7-8 illustrates a process diagram of the comprehensive cybersecurity system, detailing the flow of data collection, web scraping, feature engineering, machine learning model training, evaluation, deployment, and continuous adaptation. Each step is represented with corresponding pseudocode blocks to demonstrate the integration and interaction of various components within the system in order to prevent account takeover fraud and optimize software repositories by identifying and removing unused code.
Figure 8:
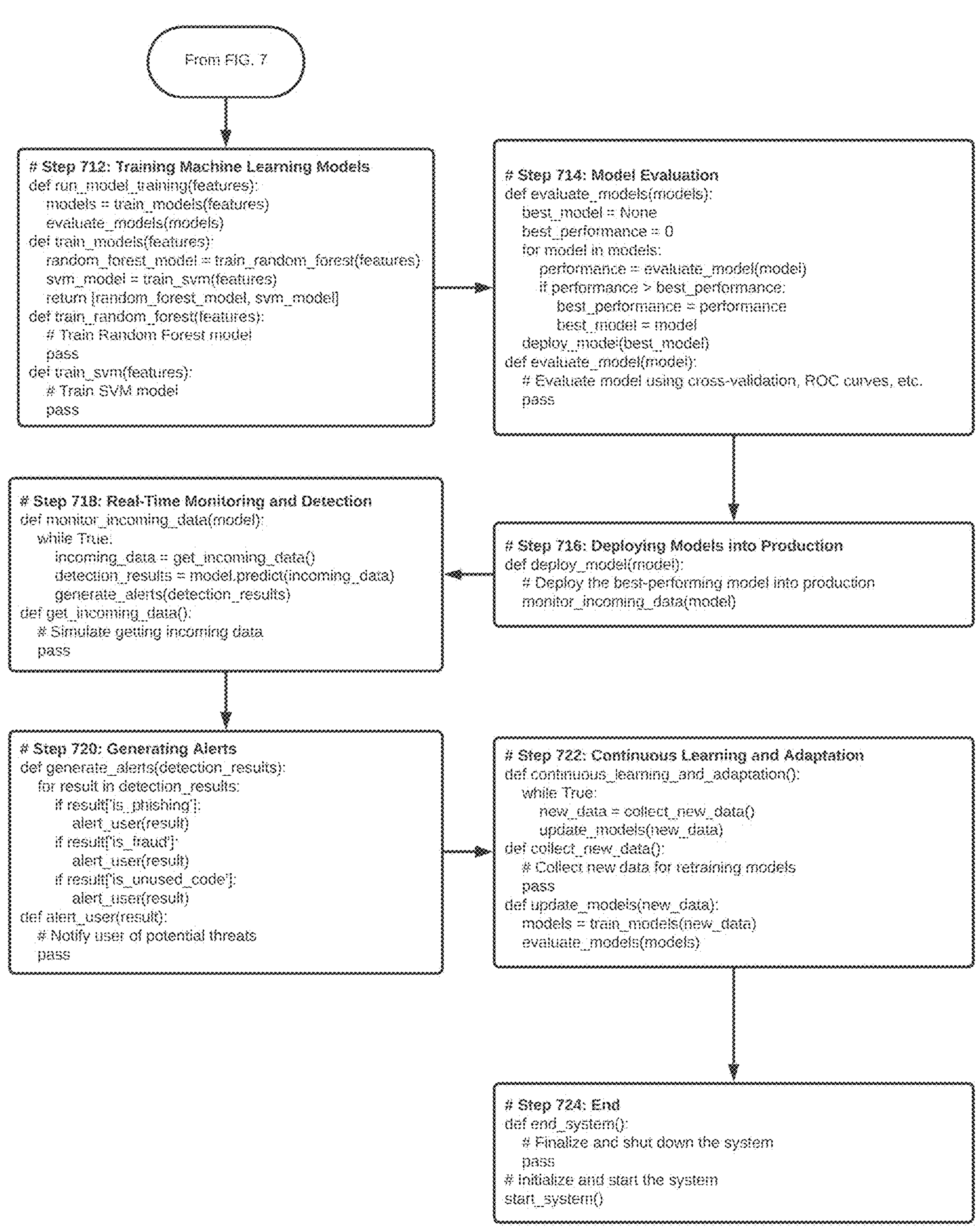

By way of non-limiting reference, FIG. 7 illustrates a process diagram of the comprehensive cybersecurity system, detailing the flow of data collection, web scraping, feature engineering, machine learning model training, evaluation, deployment, and continuous adaptation. Each step is represented with corresponding pseudocode blocks to demonstrate the integration and interaction of various components within the system in order to prevent account takeover fraud and optimize software repositories by identifying and removing unused code.

This aspect of the invention presents a comprehensive cybersecurity system designed to address several critical issues, including phishing detection, account takeover fraud prevention, and software repository optimization. This advanced system integrates web crawling, web scraping, feature engineering, and machine learning techniques to provide robust and adaptive protection. The system begins with an advanced data collection module that gathers extensive data from a wide array of sources, including transaction logs, customer information databases, device details, external data sources, and historical fraud data, in addition to emails and SMS messages. By expanding the range of data sources, the system builds a comprehensive and detailed dataset, providing a robust foundation for accurately detecting phishing attempts, preventing account takeover fraud, and identifying unused code in repositories.

The data collection process is initiated using sophisticated web crawlers that systematically browse the internet and gather data from these sources (Step 702). These web crawlers are highly efficient, using multi-threaded downloading mechanisms that include queue and scheduler processes to handle large volumes of data continuously and seamlessly. The collected raw data includes HTML content, email headers, bodies, attachments, transaction records, device fingerprints, and more. Once the raw data is collected, it is stored in a high-capacity database designed to handle large volumes of unstructured data (Step 704). This database includes capabilities for indexing and cataloging the data for quick retrieval and analysis. Secure storage mechanisms, such as encryption and redundancy, are employed to protect sensitive information and ensure data integrity.

The next phase involves web scraping, where specialized agents analyze the collected data to extract relevant features (Step 706). The web scraping agents parse the HTML content, identifying specific tags and attributes indicative of phishing, fraudulent transactions, or unused code. The process involves parsing HTML documents, breaking down the HTML code into fundamental components such as text, images, links, and metadata. The agents extract relevant features, identifying and extracting features such as suspicious URLs, sender reputation, message patterns, transaction anomalies, and code usage metrics. The web scraping agents convert the raw data into a structured format, organizing it into a coherent and analyzable form suitable for machine learning analysis (Step 708). The agents employ natural language processing (NLP) and pattern recognition techniques to ensure high accuracy in feature extraction. The structured data is stored alongside the raw data in the database, creating a comprehensive repository for further analysis.

Feature engineering is a crucial step that involves creating new, meaningful features from the raw and refined data (Step 710). For phishing detection, features might include the presence of suspicious URLs, email sender reputation, message content patterns, and attachments. In the context of account takeover fraud prevention, features such as unusual login locations, atypical transaction amounts, changes in device fingerprints, and deviations from normal user behavior are engineered. For software repository optimization, features might include code usage frequency, dependency analysis, code complexity metrics, commit histories, and the presence of redundant or obsolete code. These features are critical for training machine learning models, providing them with the necessary context to make accurate predictions. The feature engineering process ensures that the data fed into the models is of the highest quality, enhancing the models' learning and predictive capabilities.

The system employs multiple machine learning models, including Random Forest and Support Vector Machine (SVM) algorithms (Step 712). These models are trained using the comprehensive datasets created through the data collection and feature engineering processes. The training process involves creating an ensemble of decision trees for the Random Forest model and optimizing hyperparameters for the SVM model. The models are evaluated using rigorous testing and validation techniques, including cross-validation, receiver operating characteristic (ROC) curves, confusion matrices, precision, recall, F1 score, and area under the ROC curve (AUC) (Step 714). The best-performing models are selected based on their predictive accuracy and reliability.

Once the models are trained and validated, they are deployed into production environments where they monitor incoming data in real-time (Step 716). For phishing detection, the models analyze real-time communications, such as emails and SMS messages, to identify and flag suspicious activities. These activities might include messages containing phishing links, malicious attachments, or abnormal sender behaviors. For account takeover fraud prevention, the models continuously monitor transactions and user behaviors, flagging activities that deviate from established patterns. This includes unusual login locations, significant changes in transaction amounts, and other anomalies. In terms of software repository optimization, the models continuously analyze codebases to identify and flag unused or redundant code. The models used for this purpose assess usage patterns, dependencies, and code complexity to accurately identify segments of code that are no longer needed. This helps maintain clean and efficient code repositories, reducing build sizes and minimizing potential security vulnerabilities. By removing redundant code, the system ensures that software development processes remain efficient and secure.

The system's continuous learning and adaptation capabilities ensure its long-term effectiveness (Step 722). As new data is collected and new patterns emerge, the system's models are retrained and updated. This continuous feedback loop involves incorporating real-time data from actual phishing attempts, fraudulent transactions, and software repository changes to refine the models. Techniques such as active learning, reinforcement learning, and incremental learning are employed to ensure the models remain up-to-date and effective. The system integrates real-time alert mechanisms to provide immediate notifications about potential threats (Step 720). When a phishing attempt, fraudulent transaction, or redundant code segment is detected, the system generates an alert, notifying the user or system administrator. These alerts include detailed information about why the activity was flagged, helping users understand the potential risks and take appropriate actions. The alert system can integrate with existing email and messaging interfaces, providing visual indicators or notifications within the user interface to highlight suspicious activities.

The robust design of the system ensures scalability and adaptability, making it capable of handling large volumes of data and evolving threats. The integration of web crawling, web scraping, feature engineering, and machine learning creates a comprehensive solution that enhances both cybersecurity and software development processes. The system's ability to operate continuously and adapt to new threats ensures long-term protection and efficiency, providing users with reliable tools to safeguard against cybersecurity challenges and optimize software performance.

In conclusion, the improved system offers a multi-faceted approach to enhancing cybersecurity and optimizing software repositories. By leveraging advanced data collection, feature engineering, and machine learning techniques, the system provides robust protection against phishing, account takeover fraud, and redundant code in repositories. This comprehensive approach ensures that users are safeguarded against evolving cybersecurity challenges while maintaining efficient software development processes. The continuous learning and real-time alert mechanisms further enhance the system's effectiveness, making it an indispensable tool in the ongoing effort to improve cybersecurity and software optimization. This expanded explanation details the intricate processes and advanced technologies employed by the improved system, highlighting its comprehensive and adaptive nature in addressing multiple cybersecurity challenges.

Figure 9:
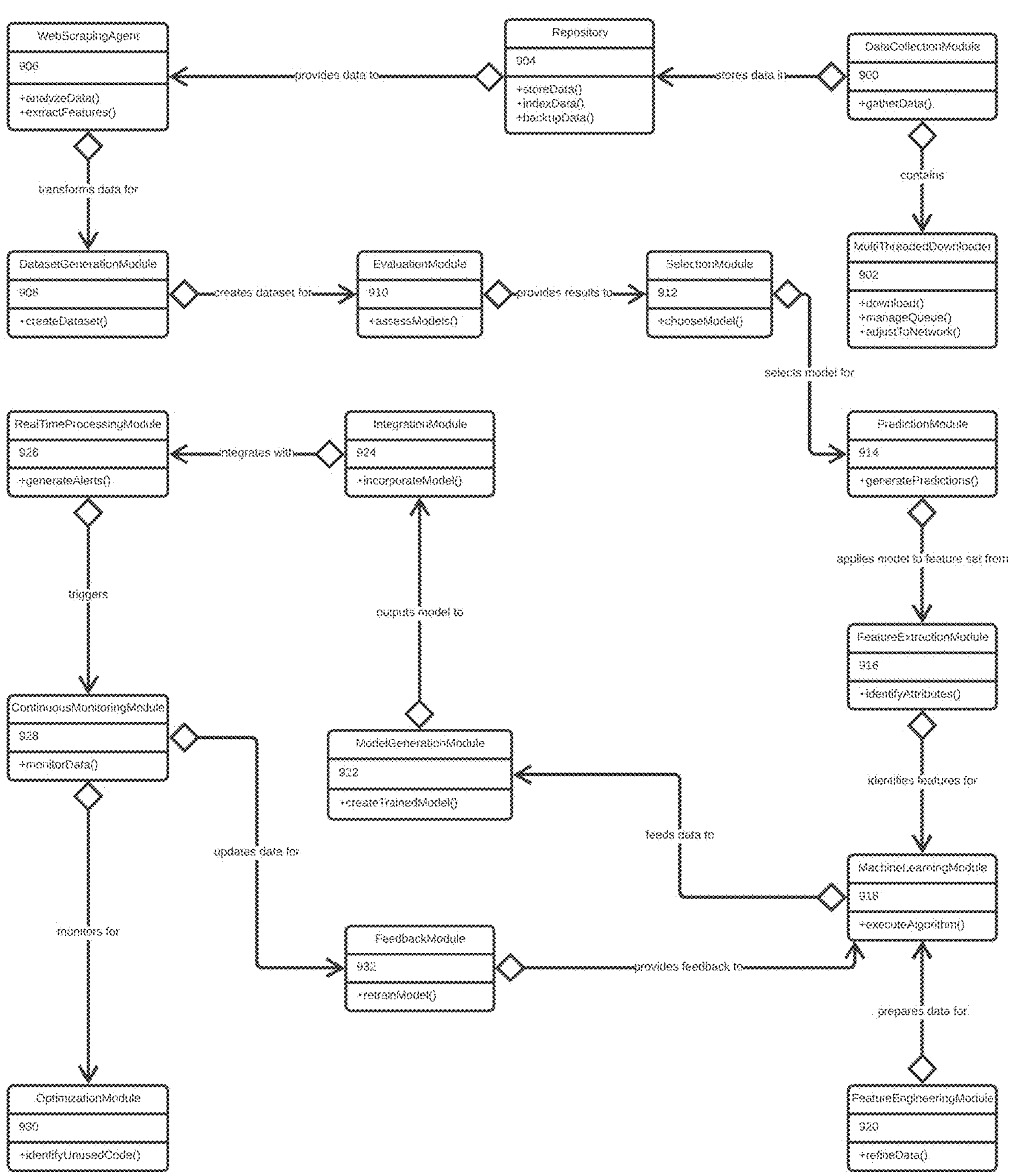
FIG. 9 illustrates a sample class diagram for an architecture of an advanced cybersecurity system for detecting phishing, preventing account takeover fraud, and optimizing software repositories.

The class diagram in FIG. 9 illustrates the architecture of an advanced cybersecurity system designed to detect phishing, prevent account takeover fraud, and optimize software repositories. This system is composed of several interconnected modules, each fulfilling a specific function to ensure comprehensive data collection, processing, analysis, and response.

The central component is the DataCollectionModule (900), which is responsible for gathering data from various online sources such as websites, email servers, messaging platforms, transaction logs, customer information databases, device details, external data sources, and historical fraud data. This module is configured to operate continuously, ensuring that the system always has up-to-date information for analysis. The continuous operation is crucial for the system to stay current with the latest threats and trends in cybersecurity.

The MultiThreadedDownloader (902) works within the DataCollectionModule to handle multiple data streams simultaneously. It includes functions for downloading data (+download( )), managing the queue (+manageQueue( )), and adjusting to network conditions (+adjustToNetwork( )). These functions allow the downloader to dynamically manage the prioritization and organization of downloading tasks, ensuring efficient and timely data collection without bottlenecks or delays. The advanced scheduling algorithms employed here optimize the efficiency of data collection processes by considering factors such as network traffic, data source availability, and download completion status.

Once collected, the data is stored in the Repository (904). This high-capacity database is designed to handle large volumes of unstructured data, including raw HTML content, email headers, bodies, attachments, transaction logs, and other relevant information. The repository's functions include storing data (+storeData( )), indexing data (+indexData( )), and ensuring data redundancy and backup for enhanced data security (+backupData( )). These capabilities ensure that the stored data is easily retrievable and secure, protecting it against potential data loss or unauthorized access.

The WebScrapingAgent (906) is tasked with analyzing the stored data and extracting relevant features. This agent parses and identifies HTML elements, metadata, and other indicators to transform unstructured data into a structured data model suitable for machine learning analysis. The agent breaks down the data into smaller components, such as email headers, bodies, attachments, and embedded hyperlinks, through functions like analyzing data (+analyzeData( )) and extracting features (+extractFeatures( )). This detailed breakdown is essential for accurate data analysis and subsequent machine learning processes.

The DatasetGenerationModule (908) creates an after-processing dataset that includes both a testing dataset and a training dataset for machine learning analysis (+createDataset( )). This module ensures that the data is properly partitioned to facilitate effective model training and validation, using stratified sampling techniques to maintain data representativeness. The creation of a well-balanced dataset is critical for the accuracy and reliability of the machine learning models.

The EvaluationModule (910) assesses multiple machine learning models, including Random Forest and Support Vector Machine (SVM) algorithms, to determine their accuracy in predicting phishing attempts and account takeover fraud. This module employs rigorous testing, cross-validation, and performance metrics analysis to identify the best-performing models (+assessModels( )). The evaluation process includes calculating precision, recall, F1 score, and the area under the receiver operating characteristic (ROC) curve to ensure that the models are robust and reliable under different conditions.

Once the models are evaluated, the SelectionModule (912) chooses one or more optimal models based on the evaluation results (+chooseModel( )). The selected models are those that provide the highest predictive accuracy and reliability for phishing detection and account takeover fraud prevention. The selection process considers model stability and generalizability, ensuring that the chosen models perform well across various datasets.

The PredictionModule (914) applies the selected machine learning models to generate phishing predictions from new data (+generatePredictions( )). This module uses the trained models to classify incoming emails and messages as phishing or legitimate, providing detailed probability scores and classification explanations for each prediction. This real-time classification capability is crucial for immediate threat detection and response.

The FeatureExtractionModule (916) identifies specific attributes from the data that are most relevant for detecting phishing and account takeover fraud (+identifyAttributes( )). This module isolates attributes such as the sender's email address, subject line, embedded hyperlinks, message body content, attachments, transaction anomalies, login locations, device fingerprints, email send time, and domain reputation. It uses feature selection algorithms like chi-square, mutual information, and recursive feature elimination to enhance the detection capabilities.

The MachineLearningModule (918) executes algorithms to learn from the data and improve future predictions (+executeAlgorithm( )). This module continuously adapts to new phishing techniques and account takeover methods through ongoing training and updating of the model, utilizing techniques such as gradient boosting, bagging, and ensemble learning to improve its predictive capabilities through iterative training processes. This continuous adaptation ensures that the model remains effective against evolving threats.

The ModelGenerationModule (922) creates a trained model representing the best-performing version of the machine learning algorithm (+createTrainedModel( )). This process involves hyperparameter tuning and model optimization to ensure high accuracy and reliability in phishing detection and account takeover fraud prevention. The trained model is then ready to be integrated into the system for real-time application.

The IntegrationModule (924) incorporates the trained model into the system's security infrastructure by setting up an API or script to process incoming emails, SMS messages, and transactions (+incorporateModel( )). This API extracts features from these messages and transactions, enabling real-time analysis and detection with automated alert mechanisms for phishing attempts and fraudulent transactions. This integration is crucial for providing immediate responses to detected threats.

The FeatureEngineeringModule (920) refines the data by selecting, manipulating, and transforming raw data into useful features for supervised learning (+refineData( )). Techniques such as normalization, scaling, and dimensionality reduction are applied to ensure that the data fed into the model is of the highest quality, which is essential for accurate predictions.

The RealTimeProcessingModule (926) generates accurate predictions and timely alerts about potential phishing attempts, account takeover fraud, and unused code segments in software repositories (+generateAlerts( )). It ensures users receive immediate notifications about suspicious activities, with customizable alert settings and integration with existing security systems. This real-time processing capability is essential for mitigating risks and preventing security breaches.

The ContinuousMonitoringModule (928) continuously monitors incoming data and transactions, flagging suspicious behavior in real-time to prevent unauthorized access and fraudulent transactions (+monitorData( )). This module analyzes behavior patterns and detects anomalies indicative of account takeover attempts, providing a robust layer of security.

The OptimizationModule (930) identifies and flags unused code segments in software repositories, allowing developers to remove them, thereby optimizing build sizes and improving software performance and security (+identifyUnusedCode( )). This module analyzes code usage frequency, dependency analysis, and code complexity metrics to accurately identify segments of code that are no longer needed.

The FeedbackModule (932) utilizes a continuous feedback loop to retrain the AI model using real-time decisioning feeds (+retrainModel( )). This module enhances the model's ability to adapt to new phishing techniques, account takeover methods, and changes in the codebase, ensuring long-term protection against evolving threats. Techniques such as active learning, reinforcement learning, and periodic retraining sessions are used to maintain high levels of accuracy in detecting phishing attempts, preventing account takeover fraud, and optimizing software repositories.

The interactions between these modules are illustrated by the arrows in the class diagram, indicating the flow of data and the sequence of operations. The DataCollectionModule provides data to the Repository, which in turn stores data for the WebScrapingAgent to transform. The transformed data is used by the DatasetGenerationModule to create datasets for the EvaluationModule to assess models. The SelectionModule then selects models for the PredictionModule to apply.

The FeatureExtractionModule identifies features for the MachineLearningModule to use in algorithm execution. The ModelGenerationModule outputs trained models to the IntegrationModule, which integrates these models into the system. The FeatureEngineeringModule refines data for real-time processing by the RealTimeProcessingModule. The ContinuousMonitoringModule monitors data, while the OptimizationModule identifies unused code. The FeedbackModule continuously provides feedback to retrain the model, ensuring the system adapts to new threats and maintains high performance.

Overall, this comprehensive system design ensures robust, scalable, and adaptive cybersecurity measures to protect against a wide range of threats while optimizing software development processes. Each module plays a critical role in maintaining the integrity, security, and efficiency of the entire system, providing a holistic solution to modern cybersecurity challenges.

Although the present technology has been described based on what is currently considered the most practical and preferred implementations, it is to be understood that this detail is only for that purpose and this disclosure is not limited to the sample descriptions and implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A cybersecurity method for detecting phishing, preventing account takeover fraud, and optimizing software repositories, comprising the steps of:

accessing an internet to gather data from various online sources including websites, email servers, messaging platforms, transaction logs, customer information databases, device details, external data sources, and historical fraud data, wherein data collection is performed continuously to ensure up-to-date information is available for analysis;

executing multi-threaded downloaders to handle multiple data streams simultaneously, where the multi-threaded downloaders include queue and scheduler processes for managing and prioritizing downloading tasks, dynamically adjusting to network conditions and data source availability to ensure efficient and timely data collection without bottlenecks or delays;

storing downloaded data in a repository comprising a high-capacity database designed to handle large volumes of unstructured data, including raw HTML content, email headers, bodies, attachments, transaction logs, and other relevant information, with capabilities for indexing and cataloging the data for quick retrieval and analysis, and ensuring data redundancy and backup for enhanced data security;

executing a web scraping agent to analyze and extract relevant features from the data as stored, where the web scraping agent parses and identifies HTML elements, metadata, and other indicators using natural language processing and pattern recognition techniques to transform unstructured data into a structured data model suitable for machine learning analysis, including breaking down data into smaller components such as email headers, bodies, attachments, and embedded hyperlinks;

generating an after-processing dataset that includes a testing dataset and a training dataset for machine learning analysis, ensuring that the data is properly partitioned to facilitate effective model training and validation, using stratified sampling techniques to maintain data representativeness;

evaluating multiple machine learning models, including Random Forest and Support Vector Machine (SVM) algorithms, using the testing dataset to determine their accuracy in predicting phishing attempts and said account takeover fraud, involving rigorous testing, cross-validation, and performance metrics analysis, including precision, recall, F1 score, and area under a receiver operating characteristic (ROC) curve, to identify best-performing models;

selecting one or more optimal machine learning models based on evaluation results, ensuring that chosen models provide highest predictive accuracy and reliability for phishing detection and account takeover fraud prevention by considering model stability and generalizability;

applying a selected machine learning models to generate phishing predictions from new data, using the trained models to classify incoming emails and messages as phishing or legitimate, providing detailed probability scores and classification explanations for each prediction;

performing feature extraction to identify specific attributes from the data that are most relevant for detecting phishing and said account takeover fraud, including sender's email address, subject line, embedded hyperlinks, message body content, attachments, transaction anomalies, login locations, device fingerprints, email send time, and domain reputation, using feature selection algorithms such as chi-square, mutual information, and recursive feature elimination to enhance detection capabilities;

executing a machine learning algorithm to learn from the data and improve future predictions, where the machine learning algorithm continuously adapts to new phishing techniques and account takeover methods through ongoing training and model updating, utilizing techniques such as gradient boosting, bagging, and ensemble learning to improve its predictive capabilities through iterative training processes;

generating a trained model representing a best-performing version of the machine learning algorithm, ensuring that the model is optimized for high accuracy and reliability in said phishing detection and said account takeover fraud prevention by performing hyperparameter tuning and model optimization;

integrating the trained model into security infrastructure by setting up an API or script to process incoming emails, SMS messages, and transactions, where the API extracts features therefrom and passes them through the trained model for classification, enabling real-time analysis and detection with automated alert mechanisms for said phishing attempts and fraudulent transactions;

using feature engineering to refine the data, involving the selection, manipulation, and transformation of raw data into useful features for supervised learning, ensuring that the data fed into the model is of highest quality by applying techniques such as normalization, scaling, and dimensionality reduction;

providing real-time processing to generate accurate predictions and timely alerts about said phishing attempts, said account takeover fraud, and unused code segments in software repositories, ensuring users receive immediate notifications about suspicious activities, with customizable alert settings and integration with existing security systems;

continuously monitoring incoming data and transactions, flagging suspicious behavior in real-time to prevent unauthorized access and fraudulent transactions, where monitoring includes analyzing behavior patterns and detecting anomalies indicative of account takeover attempts;

identifying and flagging unused code segments in software repositories, allowing developers to remove them, thereby optimizing build sizes and improving software performance and security, where the identifying involves analyzing code usage frequency, dependency analysis, and code complexity metrics to accurately identify segments of code that are no longer needed; and utilizing a continuous feedback loop to retrain an AI model using real-time decisioning feeds, enhancing model ability to adapt to new phishing techniques, account takeover methods, and changes in a codebase, ensuring long-term protection against evolving threats and maintaining high levels of accuracy in detecting said phishing attempts, preventing said account takeover fraud, and optimizing software repositories through techniques such as active learning, reinforcement learning, and periodic retraining sessions.

2. The method of claim 1, further comprising the step of implementing advanced scheduling algorithms within the multi-threaded downloaders, wherein the advanced scheduling algorithms optimize efficiency of data collection processes by dynamically managing prioritization and organization of downloading tasks based on network traffic, data source availability, and download completion status.

3. The method of claim 2, further comprising the step of ensuring data redundancy and backup within the repository by utilizing distributed storage systems and encryption techniques, thereby protecting integrity and confidentiality of the data against potential loss or unauthorized access.

4. The method of claim 3, wherein the web scraping agent further breaks down data into smaller components such as reduced-size versions of said email headers, said bodies, said attachments, and said embedded hyperlinks, and transforms these smaller components into a structured data format suitable for further analysis, employing advanced parsing algorithms and regular expressions to accurately extract and structure the data.

5. The method of claim 4, wherein the structured data model organizes the data into a hierarchical format with labeled features, making it easier to identify patterns and anomalies indicative of phishing and said account takeover fraud, and includes metadata for each data point to provide context for machine learning analysis, supporting efficient querying and retrieval for model training and evaluation.

6. The method of claim 5, further comprising the step of evaluating the machine learning models using techniques such as cross-validation, receiver operating characteristic (ROC) curves, and confusion matrices to ensure robustness and accuracy of the models under different conditions and with different types of data, providing comprehensive performance reports and visualizations for model comparison.

7. The method of claim 6, wherein feature extraction includes isolating specific attributes from the data, such as sender's email address, subject line, said embedded hyperlinks, message body content, said attachments, email send time, domain reputation, and language patterns, using feature selection algorithms like chi-square, mutual information, and recursive feature elimination to enhance detection of said phishing attempts and said account takeover fraud.

8. The method of claim 7, wherein the machine learning algorithm further employs techniques such as gradient boosting, bagging, and ensemble learning to improve its predictive capabilities through iterative training processes, incorporating methods like grid search and random search for hyperparameter optimization.

9. The method of claim 8, wherein integration of the trained model into the security infrastructure includes setting up an API or script that provides immediate phishing detection and alerts by analyzing messages and transactions in real-time, leveraging the trained model to classify messages and transactions, generate alerts for users, and include detailed explanations of why a message or transaction was flagged as phishing or fraudulent, with options for user feedback and interaction to continuously refine the model.

10. The method of claim 9, wherein the continuous feedback loop further incorporates active learning, reinforcement learning, and periodic retraining sessions to adapt to evolving phishing techniques and threats, utilizing new data from actual phishing attempts and legitimate messages to continuously improve model accuracy and effectiveness over time, ensuring long-term protection against emerging cyber threats.

11. A cybersecurity system for detecting phishing, preventing account takeover fraud, and optimizing software repositories, comprising:

at least one hardware processor;

a non-transitory computer-readable storage medium storing instructions which, when executed by the at least one hardware processor, cause the system to implement:

a data collection module configured to access an internet to gather data from various online sources including websites, email servers, messaging platforms, transaction logs, customer information databases, device details, external data sources, and historical fraud data, wherein the data collection module operates continuously to ensure up-to-date information is collected for analysis;

multi-threaded downloaders within the data collection module designed to handle multiple data streams simultaneously, incorporating advanced queue and scheduler processes for managing and prioritizing downloading tasks, dynamically adjusting to network conditions and data source availability to ensure efficient and timely data collection without bottlenecks or delays;

a repository for storing the data as downloaded, where the repository is a high-capacity database designed to handle large volumes of unstructured data, including raw HTML content, email headers, bodies, attachments, transaction logs, and other relevant information, with capabilities for indexing and cataloging the data for quick retrieval and analysis, and ensuring data redundancy and backup for enhanced data security;

a web scraping agent configured to analyze and extract relevant features from the stored data, where the web scraping agent parses and identifies HTML elements, metadata, and other indicators using natural language processing and pattern recognition techniques to transform unstructured data into a structured data model suitable for machine learning analysis, including breaking down data into smaller components such as email headers, bodies, attachments, and embedded hyperlinks;

a dataset generation module configured to create an after-processing dataset that includes both a testing dataset and a training dataset for machine learning analysis, ensuring the data is properly partitioned to facilitate effective model training and validation, using stratified sampling techniques to maintain data representativeness;

an evaluation module configured to assess multiple machine learning models, including Random Forest and Support Vector Machine (SVM) algorithms, using the testing dataset to determine their accuracy in predicting phishing attempts and said account takeover fraud, involving rigorous testing, cross-validation, and performance metrics analysis, including precision, recall, F1 score, and area under a receiver operating characteristic (ROC) curve, to identify best-performing models;

a selection module configured to choose one or more optimal machine learning models based on evaluation results, ensuring chosen models provide highest predictive accuracy and reliability for phishing detection and said account takeover fraud prevention by considering model stability and generalizability;

a prediction module configured to apply the machine learning models as selected to generate phishing predictions from new data, using the trained models to classify incoming emails and messages as phishing or legitimate, providing detailed probability scores and classification explanations for each prediction;

a feature extraction module configured to identify specific attributes from the data that are most relevant for detecting phishing and said account takeover fraud, including sender's email address, subject line, embedded hyperlinks, message body content, attachments, transaction anomalies, login locations, device fingerprints, email send time, and domain reputation, using feature selection algorithms such as chi-square, mutual information, and recursive feature elimination to enhance detection capabilities;

a machine learning module configured to execute a machine learning algorithm to learn from the data and improve future predictions, where the machine learning algorithm continuously adapts to new phishing techniques and account takeover methods through ongoing training and updating of the model, utilizing techniques such as gradient boosting, bagging, and ensemble learning to improve its predictive capabilities through iterative training processes;

a model generation module configured to create a trained model representing a best-performing version of the machine learning algorithm, ensuring the model is optimized for high accuracy and reliability in phishing detection and said account takeover fraud prevention by performing hyperparameter tuning and model optimization;

an integration module configured to incorporate the trained model into security infrastructure by setting up an API or script to process incoming emails, SMS messages, and transactions, where the API extracts features from these messages and transactions and passes them through the trained model for classification, enabling real-time analysis and detection with automated alert mechanisms for said phishing attempts and fraudulent transactions;

a feature engineering module configured to refine the data, involving selection, manipulation, and transformation of raw data into useful features for supervised learning, ensuring the data fed into the model is of highest quality by applying techniques such as normalization, scaling, and dimensionality reduction;

a real-time processing module configured to generate accurate predictions and timely alerts about potential phishing attempts, account takeover fraud, and unused code segments in software repositories, ensuring users receive immediate notifications about suspicious activities, with customizable alert settings and integration with existing security systems;

a continuous monitoring module configured to monitor incoming data and transactions, flagging suspicious behavior in real-time to prevent unauthorized access and fraudulent transactions, where the monitoring includes analyzing behavior patterns and detecting anomalies indicative of account takeover attempts;

an optimization module configured to identify and flag unused code segments in software repositories, allowing developers to remove them, thereby optimizing build sizes and improving software performance and security, where identification involves analyzing code usage frequency, dependency analysis, and code complexity metrics to accurately identify segments of code that are no longer needed; and a feedback module configured to utilize a continuous feedback loop to retrain the AI model using real-time decisioning feeds, enhancing model ability to adapt to new phishing techniques, account takeover methods, and changes in a codebase, ensuring long-term protection against evolving threats and maintaining high levels of accuracy in detecting phishing attempts, preventing said account takeover fraud, and optimizing software repositories through techniques such as active learning, reinforcement learning, and periodic retraining sessions.

12. The system of claim 11, wherein advanced scheduling algorithms within the multi-threaded downloaders optimize efficiency of data collection processes by dynamically managing prioritization and organization of downloading tasks based on network traffic, data source availability, and download completion status.

13. The system of claim 12, wherein the repository further ensures data redundancy and backup by utilizing distributed storage systems and encryption techniques, thereby protecting integrity and confidentiality of the stored data against potential loss or unauthorized access.

14. The system of claim 13, wherein the web scraping agent further breaks down data into smaller components such as email headers, bodies, attachments, and embedded hyperlinks, and transforms these components into a structured data format suitable for further analysis, employing advanced parsing algorithms and regular expressions to accurately extract and structure the data.

15. The system of claim 14, wherein the structured data model organizes the data into a hierarchical format with labeled features, making it easier to identify patterns and anomalies indicative of phishing and said account takeover fraud, and includes metadata for each data point to provide context for machine learning analysis, supporting efficient querying and retrieval for model training and evaluation.

16. The system of claim 15, wherein the evaluation module further utilizes techniques such as cross-validation, receiver operating characteristic (ROC) curves, and confusion matrices to ensure robustness and accuracy of the machine learning models under different conditions and with different types of data, providing comprehensive performance reports and visualizations for model comparison.

17. The system of claim 16, wherein the feature extraction module includes capabilities for isolating specific attributes from the data, such as sender's email address, subject line, embedded hyperlinks, message body content, attachments, email send time, domain reputation, and language patterns, using feature selection algorithms like chi-square, mutual information, and recursive feature elimination to enhance detection of said phishing attempts and said account takeover fraud.

18. The system of claim 17, wherein the machine learning module further employs techniques such as gradient boosting, bagging, and ensemble learning to improve its predictive capabilities through iterative training processes, incorporating methods like grid search and random search for hyperparameter optimization.

19. The system of claim 18, wherein the integration module includes an API or script that provides immediate phishing detection and alerts by analyzing the messages and transactions in real-time, leveraging the trained model to classify messages and transactions, generate alerts for users, and include detailed explanations of why a message or transaction was flagged as phishing or fraudulent, with options for user feedback and interaction to continuously refine the model.

20. A cybersecurity method for detecting phishing, preventing account takeover fraud, and optimizing software repositories, comprising the steps of:

accessing an internet to gather data from various online sources including websites, email servers, messaging platforms, transaction logs, customer information databases, device details, external data sources, and historical fraud data;

executing multi-threaded downloaders to handle multiple data streams simultaneously, including queue and scheduler processes for managing and prioritizing downloading tasks;

storing the data as downloaded in a repository comprising a high-capacity database designed to handle large volumes of unstructured data, including raw HTML content, email headers, bodies, attachments, transaction logs, and other relevant information;

executing a web scraping agent to analyze and extract relevant features from the stored data, including parsing and identifying HTML elements, metadata, and other indicators to transform unstructured data into a structured data model suitable for machine learning analysis;

generating an after-processing dataset that includes a testing dataset and a training dataset for machine learning analysis, ensuring the data is properly partitioned for effective model training and validation;

evaluating multiple machine learning models, including Random Forest and Support Vector Machine (SVM) algorithms, using the testing dataset to determine their accuracy in predicting phishing attempts and said account takeover fraud, involving rigorous testing, cross-validation, and performance metrics analysis to identify best-performing models;

selecting one or more optimal machine learning models based on the evaluation results, ensuring chosen models provide highest predictive accuracy and reliability;

applying the optimal machine learning models to generate phishing predictions from new data, using trained models to classify incoming emails and messages as phishing or legitimate;

performing feature extraction to identify specific attributes from the data that are most relevant for detecting phishing and said account takeover fraud, including sender's email address, subject line, embedded hyperlinks, message body content, attachments, transaction anomalies, login locations, and device fingerprints;

executing a machine learning algorithm to learn from the data and improve future predictions, where the machine learning algorithm continuously adapts to new phishing techniques and account takeover methods through ongoing training and updating of the model;

generating a trained model representing a best-performing version of the machine learning algorithm, ensuring the model is optimized for high accuracy and reliability in detecting phishing and said account takeover fraud;

integrating the trained model into a security infrastructure by setting up an API or script to process incoming emails, SMS messages, and transactions, where the API extracts features from these messages and transactions and passes them through the trained model for classification, enabling real-time analysis and detection;

using feature engineering to refine the data, involving the selection, manipulation, and transformation of raw data into useful features for supervised learning;

providing real-time processing to generate accurate predictions and timely alerts about potential phishing attempts, said account takeover fraud, and unused code segments in software repositories;

continuously monitoring incoming data and transactions, flagging suspicious behavior in real-time to prevent unauthorized access and fraudulent transactions;

identifying and flagging unused code segments in software repositories, allowing developers to remove them, thereby optimizing build sizes and improving software performance and security; and utilizing a continuous feedback loop to retrain the AI model using real-time decisioning feeds, enhancing model ability to adapt to new phishing techniques, account takeover methods, and changes in a codebase, ensuring long-term protection and efficiency.

* * * * *